(12) United States Patent  
Naijo et al.

(10) Patent No.: US 9,389,480 B2  
(45) Date of Patent: Jul. 12, 2016

(54) METHOD FOR MANUFACTURING AN ELECTROCHROMIC DISPLAY DEVICE AND AN ELECTROCHROMIC DISPLAY DEVICE HAVING THROUGH-HOLE IN DISPLAY ELECTRODE

(71) Applicants: Yoshihisa Naijo, Kanagawa (JP); Tohru Yashiro, Kanagawa (JP); Shigenobu Hirano, Kanagawa (JP); Yoshinori Okada, Kanagawa (JP); Sukchan Kim, Kanagawa (JP); Koh Fujimura, Tokyo (JP); Hiroyuki Takahashi, Kanagawa (JP); Kazuaki Tsuji, Kanagawa (JP)

(72) Inventors: Yoshihisa Naijo, Kanagawa (JP); Tohru Yashiro, Kanagawa (JP); Shigenobu Hirano, Kanagawa (JP); Yoshinori Okada, Kanagawa (JP); Sukchan Kim, Kanagawa (JP); Koh Fujimura, Tokyo (JP); Hiroyuki Takahashi, Kanagawa (JP); Kazuaki Tsuji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 361 days.

(21) Appl. No.: 13/853,136

(22) Filed: Mar. 29, 2013

(65) Prior Publication Data

US 2013/0258439 A1 Oct. 3, 2013

(30) Foreign Application Priority Data

Mar. 30, 2012 (JP) ................. 2012-082240

(51) Int. Cl.  
 *G02F 1/153* (2006.01)  
 *G02F 1/155* (2006.01)  
(52) U.S. Cl.  
 CPC ........... *G02F 1/155* (2013.01); *Y10T 29/49117* (2015.01)

(58) Field of Classification Search  
CPC ..... G02B 21/06; G02B 21/24; G01N 21/6458  
USPC ................................. 359/290–298  
See application file for complete search history.

(56) References Cited

U.S. PATENT DOCUMENTS

| 6,301,038 | B1 | 10/2001 | Fitzmaurice et al. |
| 7,880,955 | B2 | 2/2011 | Naijo et al. |
| 7,952,791 | B2 | 5/2011 | Yanagisawa et al. |
| 7,990,602 | B2 | 8/2011 | Tatsuura et al. |
| 8,144,117 | B2 | 3/2012 | Okada et al. |
| 8,384,983 | B2 | 2/2013 | Yashiro et al. |
| 2003/0222334 | A1* | 12/2003 | Ikeda et al. ............ 257/678 |

(Continued)

FOREIGN PATENT DOCUMENTS

| JP | H02-207223 | 8/1990 |
| JP | 2007-171781 | 7/2007 |

(Continued)

OTHER PUBLICATIONS

Japanese official action dated Dec. 1, 2015 in corresponding Japanese Patent Application No. 2012-082240.

*Primary Examiner* — Bumsuk Won  
*Assistant Examiner* — Tamara Y Washington  
(74) *Attorney, Agent, or Firm* — Cooper & Dunham LLP

(57) ABSTRACT

A method for manufacturing an electrochromic display device can include a step of applying and attaching a fine particle with a predetermined particle diameter to a display substrate, a step of film-forming a transparent electrically conductive film after the fine particle is applied thereto, a step of removing the fine particle to remove a transparent electrically conductive film attached to a surface of the fine particle and to form a display electrode having a fine through-hole at a position at which the fine particle has been attached thereto, and a step of forming an electrochromic layer on the display electrode.

17 Claims, 14 Drawing Sheets

(56) References Cited

U.S. PATENT DOCUMENTS

| | | | |
|---|---|---|---|
| 2008/0158652 A1* | 7/2008 | Toyoda | G02F 1/167 359/296 |
| 2011/0096388 A1* | 4/2011 | Agrawal et al. | 359/268 |
| 2011/0134508 A1 | 6/2011 | Kawashima et al. | |
| 2011/0222139 A1 | 9/2011 | Naijo et al. | |
| 2011/0279884 A1 | 11/2011 | Fujimura et al. | |
| 2012/0050838 A1 | 3/2012 | Hirano et al. | |
| 2012/0125414 A1 | 5/2012 | Kamezaki et al. | |
| 2012/0139824 A1 | 6/2012 | Takahashi et al. | |
| 2012/0139825 A1 | 6/2012 | Yashiro et al. | |
| 2012/0154892 A1 | 6/2012 | Yashiro et al. | |

FOREIGN PATENT DOCUMENTS

| | | |
|---|---|---|
| JP | 3955641 | 8/2007 |
| JP | 2008-26454 | 2/2008 |
| JP | 2008-116718 | 5/2008 |
| JP | 2009-508794 | 3/2009 |
| JP | 2009-163005 | 7/2009 |
| JP | 2009-262004 | 11/2009 |
| JP | 2010-033016 | 2/2010 |
| JP | 2010-504421 | 2/2010 |
| JP | 2010-282128 | 12/2010 |
| JP | 2011-209688 | 10/2011 |
| JP | 2012-47955 | 3/2012 |

* cited by examiner

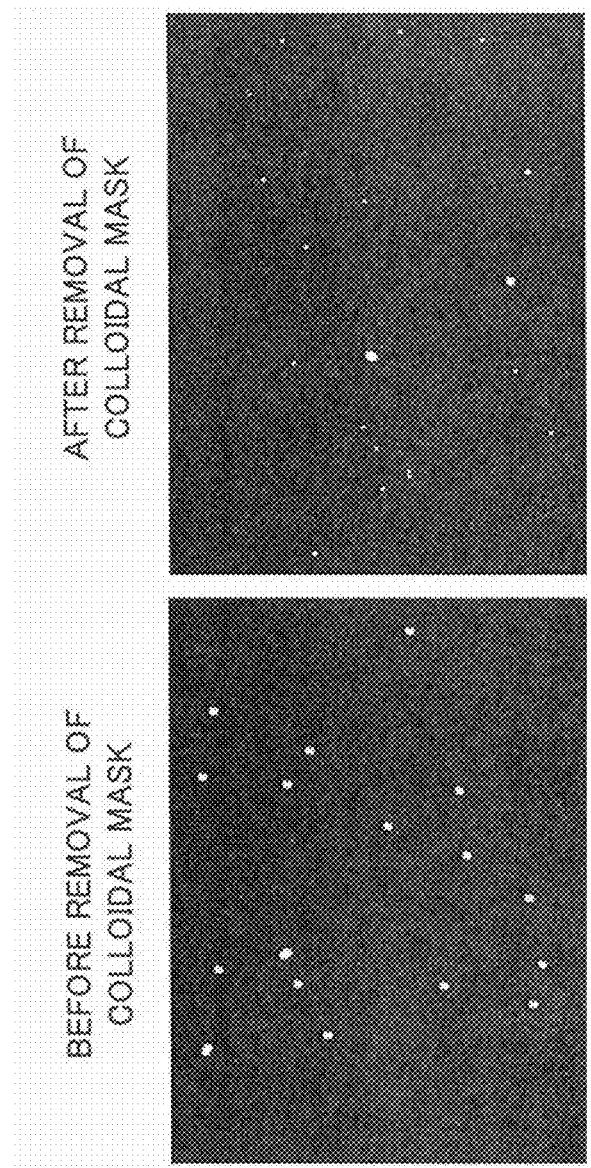

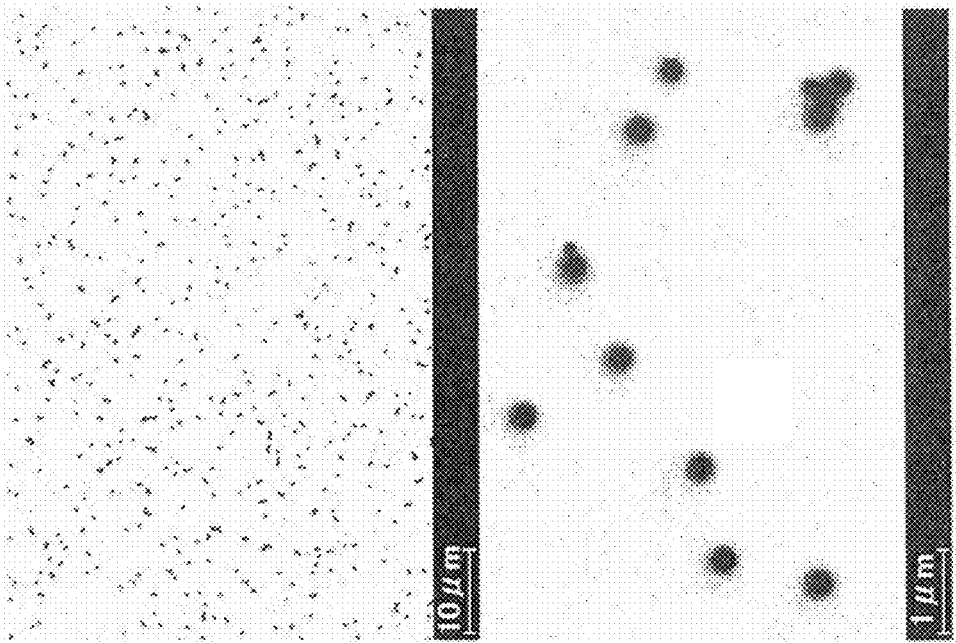
FIG. 13A BEFORE REMOVAL OF COLLOIDAL MASK
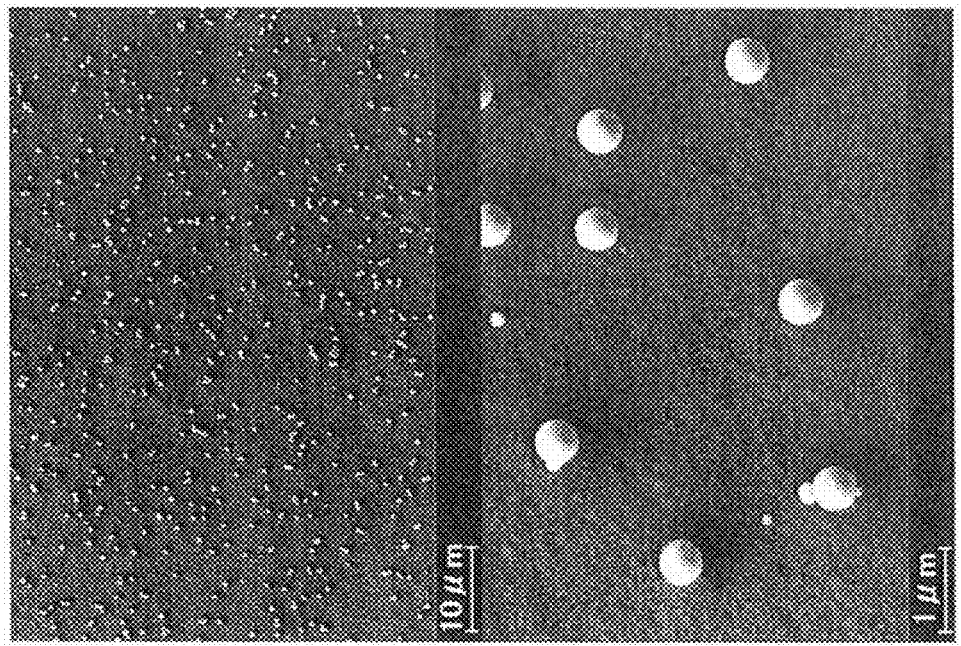
FIG. 13B AFTER REMOVAL OF COLLOIDAL MASK

METHOD FOR MANUFACTURING AN ELECTROCHROMIC DISPLAY DEVICE AND AN ELECTROCHROMIC DISPLAY DEVICE HAVING THROUGH-HOLE IN DISPLAY ELECTRODE

BACKGROUND OF THE INVENTION

1. Field of the Invention

An aspect of the present invention relates to at least one of a method for manufacturing an electrochromic display device and an electrochromic display device.

2. Description of the Related Art

In recent years, attention to an electronic paper has been attracted as an electronic medium that replaces paper. An electronic paper is characterized in that it is possible to use a display device like a paper, and a characteristic different from that of a conventional display device such as a Cathode Ray Tube (CRT) or a liquid crystal display is required. For such an electronic paper, there is a reflection-type display device with low electric power consumption and a less amount of visual fatigue as well as a self-emitting display device such as an organic EL display.

For a reflection-type display device, there is, for example, a reflection-type liquid crystal display device using a cholesteric liquid crystal, but such a display device uses a selective light reflection and has a large number of substrates for forming the display device, so that a reflectivity, a contrast ratio, a color saturation, or a color reproduction range is not sufficient and visibility is far inferior to that of a paper.

Meanwhile, for a reflection-type display device, there is an electrochromic display device using an organic electrochromic material with both high color reproducibility and display memory property, etc. An electrochromic phenomenon is also referred to as "electrochromism", and refers to a phenomenon in which a reversible oxidation reduction reaction is caused by applying an electric voltage thereto to change a color reversibly. An electrochromic display device is a display device utilizing color appearance/color disappearance (which will be described as coloring/discoloring, below) of an electrochromic compound that causes such electrochromism. Such an electrochromic display device has features of being a reflection-type display device, having a memory effect, being able to be driven at a low voltage, etc., and hence, is a potent candidate of a display device technique used for an electronic paper application.

It is possible for an electrochromic display device to develop various colors depending on a structure of an electrochromic compound, and hence, it is possible to provide a multicolor display. Japanese Patent Application Publication No. 2009-163005 and Japanese Patent Application Publication No. 2010-033016 disclose electrochromic display devices with a structure in which a plurality of layers of display electrodes and a coloring layer(s) formed of an electrochromic compound are laminated on one display substrate.

Japanese Patent Application Publication No. 2009-163005 discloses an electrochromic display device with a structure in which a display electrode is formed of an indium tin oxide (ITO) fine particle(s). Furthermore, Japanese Patent Application Publication No. 2010-033016 discloses an electrochromic display device having a display electrode and insulating layer that have permeability into an electrolyte, wherein an ITO film that is film-formed by a sputtering method is used as a display electrode. Furthermore, Japanese Patent Application Publication No. 2010-282128 discloses an electrochromic display device formed by holding an electrochromic layer on a porous sheet body having an electrical conductivity and superposing a plurality of porous sheets thereon.

However, an electrically conductive film of an electrochromic display device as disclosed in Japanese Patent Application Publication No. 2009-163005 is formed by an ITO fine particle(s), wherein an electrical conductivity of an electrically conductive film formed by an ITO fine particle(s) is low and a volume resistivity thereof is 2-5 digits higher as compared with that of an ITO electrically conductive film formed by a vacuum film formation such as sputtering. Thus, a volume resistivity and electrical conductivity of an electrically conductive film that forms a display electrode layer are high and low, respectively, which are causes that produce an in-plane non-uniformity in a display image as a surface area of such a display electrode is increased. Furthermore, when a thickness of a display electrode layer formed of an ITO fine particle(s) is increased to improve an electrical conductivity of an electrically conductive film, degradation of reflectivity and degradation of quality of an image to be displayed are caused, and hence, are not preferable.

Furthermore, an ITO film that has been film-formed by sputtering is used for a display electrode of an electrochromic display device disclosed in Japanese Patent Application Publication No. 2010-033016, wherein such an ITO film that is film-formed by sputtering is dense and has a poor ion permeability, and application of a large voltage is needed for a coloring and discoloring reaction of an electrochromic layer. That is, in a structure in which a plurality of display electrodes and electrochromic layers are laminated, increasing of a voltage to be applied to attain coloring and discoloring of an electrochromic layer provided separately from an opposed substrate is needed.

Furthermore, in an electrochromic display device as described in Japanese Patent Application Publication No. 2010-282128, blur that originates from an increase of a distance from an opposed electrode to each display electrode due to a thickness of a porous sheet per se may be generated in an image to be displayed, and moreover, an increase of a driving voltage may be required.

SUMMARY OF THE INVENTION

According to one aspect of the present invention, there is provided a method for manufacturing an electrochromic display device, including a step of forming one display electrode on a display substrate, a step of forming one electrochromic layer on the one display electrode, a step of forming an insulating layer on the one electrochromic layer, a step of applying and attaching a fine particle with a predetermined particle diameter to the insulating layer, a step of film-forming a transparent electrically conductive film after the fine particle is applied thereto, a step of removing the fine particle to remove a transparent electrically conductive film attached to a surface of the fine particle and to form an other display electrode having a fine through-hole at a position at which the fine particle has attached thereto, a step of forming an other electrochromic layer on the other display electrode, and a step of opposing an opposed substrate on which an opposed electrode is formed to the display substrate on which the other electrochromic layer is formed, via an electrolyte solution and bonding the other electrochromic layer and the opposed electrode.

According to another aspect of the present invention, there is provided a method for manufacturing an electrochromic display device, including a step of applying and attaching a fine particle with a predetermined particle diameter to a display substrate, a step of film-forming a transparent electrically conductive film after the fine particle is applied thereto, a step of removing the fine particle to remove a transparent electrically conductive film attached to a surface of the fine particle and to form a display electrode having a fine through-hole at a position at which the fine particle has been attached thereto, and a step of forming an electrochromic layer on the display electrode.

According to another aspect of the present invention, there is provided an electrochromic display device, including a display substrate, an opposed substrate arranged to oppose the display substrate, one display electrode formed on a face of the display substrate at a side at which the opposed substrate is provided, one electrochromic layer formed on the one display electrode, an insulating layer formed on the one electrochromic layer, an other display electrode formed on the insulating layer, an other electrochromic layer formed on the other display electrode, an opposed electrode formed on a face of the opposed substrate which opposes a face of the display substrate on which the other electrochromic layer is formed, and an electrolyte solution provided between the display substrate and the opposed substrate, wherein the other display electrode is provided with a fine through-hole through which an ion in the electrolyte solution passes, and layers contacting both faces of the other display electrode contact each other in the fine through-hole.

BRIEF DESCRIPTION OF THE DRAWINGS

FIG. 3 is an illustration diagram of a second display electrode 14 and a fine through-hole 14a.

FIG. 12A, FIG. 12B, and FIG. 12C are optically microscopic images before and after removal of a colloidal mask in practical example 1 (50 times).

FIG. 13A and FIG. 13B are SEM images before and after removal of a colloidal mask in practical example 4.

DETAILED DESCRIPTION OF THE PREFERRED EMBODIMENTS

Figure 1:
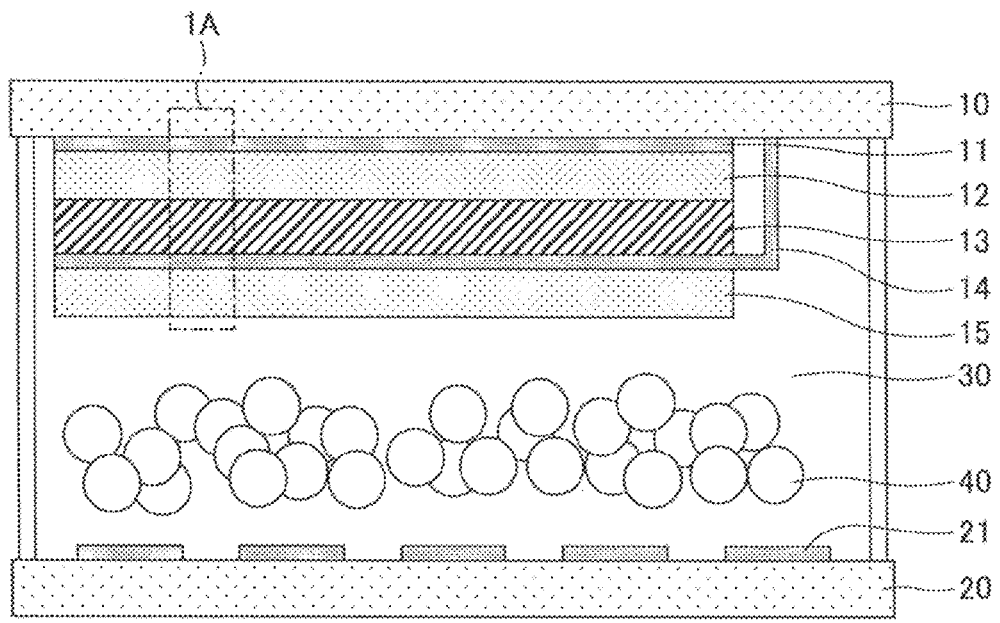
FIG. 1 is a structural diagram of an electrochromic display device in the present embodiment.

An embodiment of the present invention will be described below. Additionally, an identical member, etc., will be provided with an identical reference numeral to omit a description(s) thereof.

(An Electrochromic Display Device)

An electrochromic display device in the present embodiment will be described. As illustrated in FIG. 1, an electrochromic display device in the present embodiment has a display substrate 10 and an opposed substrate 20 that are supporting substrates. The display substrate 10 has, on a face opposing the opposed substrate 20, a first display electrode 11 formed on and contacting the display substrate 10, a first electrochromic layer 12 formed on and contacting the first display electrode 11, an insulating layer 13 formed on and contacting the first electrochromic layer 12, a second display electrode 14 formed on and contacting the insulating layer 13, and a second electrochromic layer 15 formed on and contacting the second display electrode 14. Thus, the display substrate 10 is a substrate for supporting such a laminated structure. The first electrochromic layer 12 and the second electrochromic layer 15 are formed by a porous electrode formed of an electrically conductive or semi-conductive fine particle(s) and an electrochromic molecule(s) carried on such a fine particle(s) and exhibiting a color reaction due to an oxidation reduction reaction. Additionally, the display substrate 10 is formed of a light-transmitting material and the first display electrode 11 and the second display electrode 14 are formed of a material(s) that is/are transparent for light and has/have an electrically conductivity(ies), such as transparent electrically conductive films.

Furthermore, an opposed electrode 21 is formed on a face of the opposed substrate 20 at a side opposing the display substrate 10, and an electrolyte solution layer 30 impregnated with an electrolyte solution in which an electrolyte is dissolved is provided, and further a white reflection layer 40 is formed, between the display substrate 10 and the opposed substrate 20.

It is preferable for the first electrochromic layer 12 and the second electrochromic layer 15 to be formed of electrochromic molecules that exhibit mutually different colors due to an oxidation reduction reaction, and thereby, a two-color display is possible. Specifically, for example, the first electrochromic layer 12 develops a red color and the second electrochromic layer 12 develops a blue color, so that a two- or red- and blue-color display is possible. Furthermore, it is preferable for molecular structures of the first electrochromic layer 12 and second electrochromic layer 15 to be similar thereto. As similar molecular structures are used, it is possible to provide similar coloring and discoloring electric potentials of the first display electrode 11 and second display electrode 14 and it is possible to readily control coloring and discoloring with respect to an identical electrolyte.

Moreover, a pair of layers are provided by laminating a similar display electrode and electrochromic layer and a single or plurality of such a pair are laminated and formed via an insulating film, so that it is possible to provide a three-color or four-color display.

Figure 2:
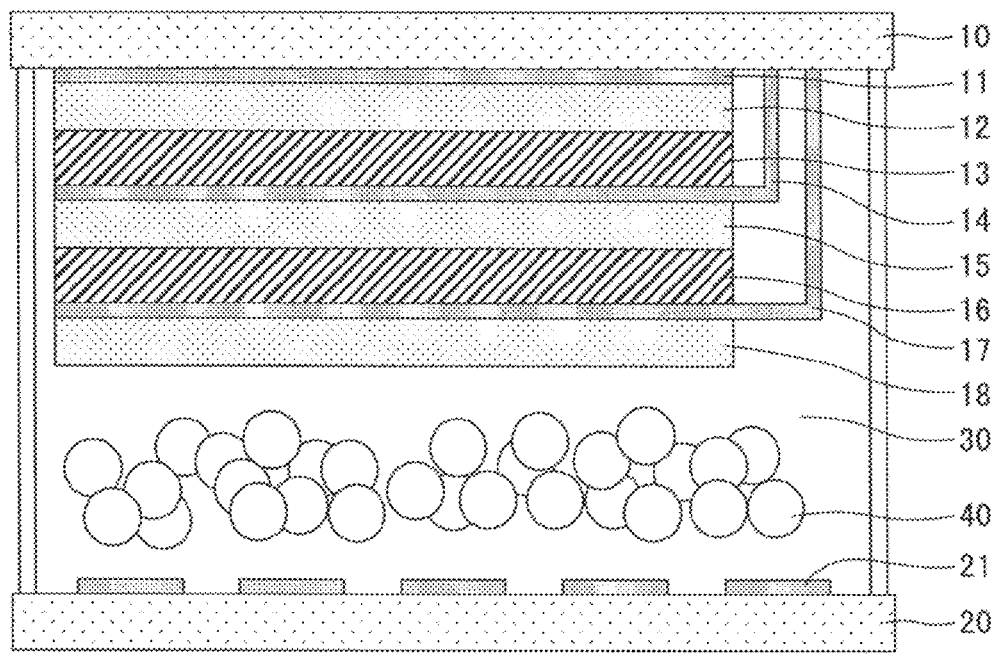
FIG. 2 is a structural diagram of another electrochromic display device in the preset embodiment.

FIG. 2 illustrates a structure of an electrochromic display device capable of providing a three-color display in the present embodiment. Such an electrochromic display device further has, on the display substrate 10 of the electrochromic display device as illustrated in FIG. 1, an insulating layer 16 formed on and contacting the second electrochromic layer 15, a third display electrode 17 formed on and contacting the insulating layer 16, and a third electrochromic layer 18 formed on and contacting the third display electrode 17. Thereby, the first electrochromic layer 12, the second electrochromic layer 15, and the third electrochromic layer 18 develop mutually different colors, so that it is possible to provide a three-color display. Specifically, for example, the first electrochromic layer 12 develops a magenta color, the second electrochromic layer 15 develops a yellow color, and the third electrochromic layer 18 develops a cyan color, so that it is possible to provide a three-color display and it is possible to provide a full color display.

(The Display Substrate 10)

The display substrate 10 is not particularly limited as long as a material thereof is transparent, and a substrate such as a glass substrate or a plastic film is used. Furthermore, a coating such as a transparent insulating layer or an anti-reflection layer may be provided on a front and back of the display substrate 10 in order to improve a water vapor barrier property, a gas barrier property, and visibility.

(The Opposed Substrate 20)

The opposed substrate 20 is not particularly required to be transparent, and hence, a glass substrate, a plastic film, a silicon substrate, a metal substrate such as stainless steel, and lamination thereof, etc., are used.

(A Display Electrode)

A display electrode such as the first display electrode 11 or the second display electrode 14 (which may be described as a "display electrode" below) is not particularly limited as long as a material thereof has a transparency and an electrical conductivity. For a material of a display electrode, a metal oxide such as indium oxide, zinc oxide, tin oxide, indium tin oxide, or indium zinc oxide is preferable. Furthermore, a network electrode of silver, gold, a carbon nanotube, a metal oxide, etc., having a transparency, or a composite layer thereof is also useful. For a fabrication method thereof is a vacuum deposition method, a sputtering method, or an ion plating method, or as long as it is possible to conduct formation by application of a material for such a display electrode, it is also possible to use a spin coat method, a casting method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method. A light transmittance of a display electrode is preferably greater than or equal to 60% and less than 100%, and more preferably, 90% or greater and less than 100%.

Furthermore, in an electrochromic display device in the present embodiment, the second display electrode 14 formed between the first display electrode 11 and the opposed electrode 21 has a fine through-hole 14a through which an ion in an electrolyte solution in the electrolyte solution layer 30 passes, and such a fine through-hole 14a is a structure filled with an electrolyte solution. That is, the second display electrode 14 is required to have the fine through-hole 14a through which an ion in an electrolyte solution passes, wherein a method for providing the second display electrode 14 with the fine through-hole 14a will be described later. Additionally, for an electrochromic display device with a layer structure in which three or more electrochromic layers are provided, the third display electrode 17, etc., is formed, and it is also possible to form the third display electrode 17, etc., by a method similar to that of the second display electrode 14.

It is preferable for a diameter of the fine through-hole 14a provided on the second display electrode 14 to be, for example, about 0.01 µm-100 µm. If a diameter of the fine through-hole 14a is less than 0.01 µm, a disadvantage may be caused in such a manner that permeation of an ion is degraded. Furthermore, if a diameter of the fine through-hole 14a is greater than 100 µm, a visible level (a size level of an electrode for one picture element in a normal display) is provided and a disadvantage may be caused in a display performance directly above the fine through-hole 14a. Additionally, in order to avoid such a problem(s) completely, it is more preferable for a diameter of the fine through-hole 14a to be 0.01 µm-1 µm.

Furthermore, it is possible to set a ratio (hole density) of a hole or open area of the fine through-hole 14a to a surface area of the second display electrode 14 appropriately, and for example, it is possible to be about 0.01%-40%. That is because if a hole density of the fine through-hole 14a is too large, a surface resistance of the second display electrode 14 may increase, and further, a defect in a colored or discolored display may be caused by increasing an area of the fine through-hole 14a to cause degradation of display quality. Furthermore, if a hole density of the fine through-hole 14a is too small, a permeability of an electrolyte ion may be degraded to cause a problem in a colored or discolored display similarly.

(The Opposed Electrode 21)

The opposed electrode 21 is not particularly limited as long as a material thereof has an electrical conductivity. For a material of the opposed electrode 21, it is possible to use a metal oxide such as indium oxide, zinc oxide, tin oxide, indium tin oxide, or indium zinc oxide, or a metal such as zinc or platinum, carbon, or a composite film thereof, etc. Furthermore, a protective layer for covering the opposed electrode 21 may be formed in such a manner that the opposed electrode 21 is not irreversibly corroded by an oxidation reduction reaction. For a method for forming the opposed electrode 21, it is possible to provide a vacuum deposition method, a sputtering method, an ion plating method, etc. Furthermore, as long as it is possible to conduct formation by application of a material for forming the opposed electrode 21, it is also possible to use a spin coat method, a casting method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method.

(A Protective Layer for Covering the Opposed Electrode 21)

A protective layer for covering the opposed electrode 21 is not particularly limited as long as a material thereof serves to prevent corrosion of the opposed electrode 21 due to an irreversible oxidation reduction reaction, and it is possible to use a variety of materials such as an insulator material including $Al_2O_3$ (aluminum oxide), $SiO_2$ (silicon oxide), or both, a semiconductor material such as zinc oxide, titanium oxide, or both, or an organic material such as a polyimide. In particular, a material that exhibits a reversible oxidation reduction reaction is useful. For example, there is a method for fixing an electrically conductive or semi-conductive metal oxide such as antimony tin oxide or nickel oxide on the opposed electrode 21 by, for example, an acryl-type, alkyd-type, isocyanate-type, urethane-type, epoxy-type, phenol-type binder, etc. As a method for forming a protective layer for covering the opposed electrode 21, it is possible to provide a vacuum deposition method, a sputtering method, an ion plating method, etc. Furthermore, as long as it is possible to conduct formation by application of a material for forming a protective layer, it is also possible to use a spin coat method, a casing method, a microgravure coat method, a gravure coat method, a bar coat method, a roll coat method, a wire bar coat method, a dip coat method, a slit coat method, a capillary coat method, a spray coat method, a nozzle coat method, or each kind of printing method such as a gravure printing method, a screen printing method, a flexographic printing method, an offset printing method, a reverse printing method, or an ink jet print method.

(An Electrochromic Layer)

An electrochromic layer such as the first electrochromic layer 12 or the second electrochromic layer 15 (which will be described as an "electrochromic layer" below) contains an electrochromic material, and for such an electrochromic material, any of an inorganic electrochromic compound and an organic electrochromic compound may be used. Furthermore, it is also possible to use an electrically conductive polymer known as one exhibiting electrochromism. For an inorganic electrochromic compound, it is possible to provide, for example, tungsten oxide, molybdenum oxide, iridium oxide, titanium oxide, etc. Furthermore, for an organic electrochromic compound, it is possible to provide viologen, rare earth phthalocyanine, styryl, etc. Furthermore, for an electrically conductive polymer, it is possible to provide poly(pyrrole), poly(thiophene), poly(aniline), a derivative thereof, etc.

Furthermore, for an electrochromic layer in an electrochromic display device in the present embodiment, it is particularly preferable to use a structure in which an organic electrochromic compound is carried on an electrically conductive or semi-conductive fine particle. Specifically, such a structure is provided by sintering a fine particle with a particle diameter of about 5 nm-50 nm on an electrode surface and adsorbing an organic electrochromic compound having a polar group such as a phosphonic acid, a carboxyl group, or a silanol group on a surface of such a fine particle. In such a structure, an effect of a large surface of a fine particle is utilized to inject an electron(s) into an organic electrochromic compound efficiently, and hence, it is possible to attain a high-speed response as compared with a conventional electrochromic display element. Moreover, it is possible to form a transparent film as a display layer by using a fine particle, and hence, it is possible to obtain a high coloring density of an electrochromic dye. Furthermore, it is also possible to carry plural kinds of organic electrochromic compounds on an electrically conductive or semi-conductive fine particle.

For a specific material, a low molecular weight organic electrochromic compound such as an azobenzene-type, an anthraquinone-type, a diarylethene-type, a dihydropyrene-type, dipyridine-type, a styryl-type, a styrylspiropyran-type, a spiro-oxazine-type, a spiro-thiopyran-type, a thioindigo-type, a tetrathiafulvalene-type, a terephthalic acid-type, a triphenylmethane-type, a triphenylamine-type, a naphthopyran-type, a viologen-type, a pyrazoline-type, a phenazine-type, a phenylenediamine-type, a phenoxazine-type, a phenothiazine-type, a phthalocyanine-type, a fluoran-type, a fulgide-type, a benzopyran-type, or a metallocene-type, or an electrically conductive polymer compound such as poly(aniline) or poly(thiophene) is used for a polymer-type or dye-type electrochromic compound.

In particular, it is preferable to contain a viologen-type compound or a dipyridine-type compound. Such materials have low coloring and discoloring electric potentials and exhibit good color values even in a structure of plural display electrodes. Viologen-types in Japanese Patent No. 3955641 and Japanese Patent Application Publication No. 2007-171781, etc., and dipyridine-types in Japanese Patent Application Publication No. 2007-171781 and Japanese Patent Application Publication No. 2008-116718, etc. are disclosed.

Moreover, in those described above, it is particularly preferable to contain a dipyridine-type compound represented by a general formula of chemical formula 1:

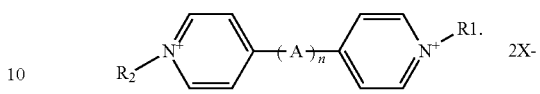

Such a material has low coloring and discoloring electric potentials, and hence, exhibits a good color value in coloring thereof due to a reduction potential even when an electrochromic display device is configured to have a plurality of display electrodes.

Additionally, in the general formula indicated by chemical formula 1, each of R1 and R2 represents independently an alkyl group with a carbon number of 1 to 8 that may have a substituent or an aryl group, wherein at least one of R1 and R2 has a substituent selected from COOH, $PO(OH)_2$, and $Si(oC_kH_{2k+1})_3$. X represents a monovalent anion. n represents 0, 1, or 2. k represents 0, 1, or 2. A represents an alkyl group with a carbon number 1 to 20 that may have a substituent, an aryl group, or a heterocyclic group.

On the other hand, an inorganic electrochromic compound such as titanium oxide, vanadium oxide, tungsten oxide, indium oxide, iridium oxide, nickel oxide, or Prussian blue is used for a metal-complex-type or metal-oxide-type electrochromic compound.

An electrically conductive or semi-conductive fine particle is not particularly limited and a metal oxide is preferable. For such a material, a metal oxide is used whose main component is titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, etc. Furthermore, such a metal oxide may be used singly or two or more kinds thereof may be mixed and used. In view of an electrical characteristic such as an electrical conductivity or a physical characteristic such as an optical property, it is possible to provide a multicolor display excellent in a response speed of coloring or discoloring when one kind selected from titanium oxide, zinc oxide, tin oxide, zirconium oxide, iron oxide, magnesium oxide, indium oxide, and tungsten oxide, or a mixture thereof is used. Inter alia, when titanium oxide is used, it is possible to provide a multicolor display more excellent in a response speed of coloring or discoloring.

Furthermore, a shape of an electrically conductive or semi-conductive fine particle is not particularly limited, and a shape with a large surface area per unit volume (which may be described as a "specific surface area", below) is used in order to carry an electrochromic compound efficiently. For example, when a fine particle is an aggregate of nanoparticles, an electrochromic compound is carried more efficiently by having a large specific surface area, and it is possible to provide a multicolor display excellent in a display contrast ratio between coloring and discoloring. Additionally, in a case of an electrochromic display device with a structure in which three or more electrochromic layers are provided, it is possible to form the third electrochromic layers 18. etc., by a method similar to that of the second electrochromic layer 15.

(The Electrolyte Solution Layer 30)

An electrolyte solution in the electrolyte solution layer 30 is composed of an electrolyte and a solvent for dissolving an electrolyte. When the display substrate 10 and the opposed substrate 20 are bonded, it is possible to impregnate with an electrolyte solution a layer fabricated at a side of the display substrate 10, such as a display electrode, an electrochromic layer, or an insulating layer. Furthermore, at a step at which the display electrode 10, the electrochromic layer, the insulating layer, etc., are fabricated, it is also possible to distribute an electrolyte in each layer, and be impregnated with a solvent when the display substrate 10 and the opposed substrate 20 are bonded. In such a method, it is possible to improve a rate of impregnation into each layer due to an osmotic pressure of an electrolyte solution.

For a material of an electrolyte, it is possible to use, for example, an inorganic ion salt such as an alkaline metal salt or an alkaline earth salt, a quaternary ammonium salt, or a supporting electrolyte of an acid or an alkali. Specifically, it is possible to use $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, $Mg(BF_4)_2$, etc. Furthermore, it is also possible to use an ionic liquid. An ionic liquid may be any of generally studied or reported substances. In particular, an organic ionic liquid has a molecular structure that exhibits liquid in a wide temperature range including room temperature. For an example of such a molecular structure, it is possible to provide, as a cationic component, an aromatic salt such as an imidazole derivative such as an N,N-dimethylimidazole salt, an N,N-methylethylimidazole salt, or an N,N-methylpropylimidazole salt, or a pyridinium derivative such as an N,N-dimethylpyridinium salt or an N,N-methylpropylpyridinium salt, or an aliphatic quaternary ammonium type such as a tetraalkylammonium salt such as a trimethylpropylammonium salt, a trimethylhexylammonium salt, or a triethylhexyl ammonium salt. For an anionic component, it is preferable to provide a compound containing fluorine in view of stability in atmosphere, and it is possible to provide $BF_4^-$, $CF_3SO_3^-$, $PF_4^-$, $(CF_3SO_2)_2N^-$, etc. It is possible to use an ionic liquid formulated by a combination of such a cationic component and an anionic component.

Furthermore, for an example of a solvent, it is possible to use propylene carbonate, acetonitrile, γ-butyrolactone, ethylene carbonate, sulfolane, dioxolane, tetrahydrofuran, 2-methyltetrahydrofuran, a dimethyl sulfoxide, 1,2-dimethoxyethane, 1,2-ethoxymethoxyethane, polyethylene glycol, an alcohol, a mixed solvent thereof, etc.

Furthermore, a liquid with a low viscosity is not required for an electrolyte solution and it is possible to be a variety of forms such as gel-like, crosslinked polymer-type, and dispersed-liquid-crystal-type ones. In particular, it is preferable to form an electrolyte solution into a gel-like or solid-like one in view of improvement of strength of an element, improvement of reliability, and prevention of coloring diffusion. For a solidification method, it is preferable to hold an electrolyte and a solvent in a polymer resin. That is because it is possible to obtain a high ionic conductivity and solid strength. Moreover, it is preferable for a polymer resin to be a photo-curable resin. That is because it is possible to manufacture an element at a low temperature and in a short period of time, as compared with thermal polymerization or a method for evaporating a solvent to provide a thin film.

(The White Reflection Layer 40)

The white reflection layer 40 is to improve a reflectance of a white color in a case where an electrochromic display element is used as a reflection-type display device. It is possible to fabricate the white reflection layer 40 by dispersing a white pigment particle(s) in an electrolyte solution or applying and forming a resin in which a white pigment particle(s) is/are dispersed, etc. For a material of a white pigment particle contained in the white reflection layer 40, for example, titanium oxide, aluminum oxide, zinc oxide, silica, cesium oxide, yttrium oxide, etc., are used.

(An Insulating Layer)

The insulating layer 13, etc., are to electrically insulate or isolate the first display electrode 11 provided with the first electrochromic layer 12 and the second display electrode 14 provided with the second electrochromic layer 15. The first display electrode 11 and the second display electrode 14 may have to be formed in such a manner that an electrical resistance between respective display electrodes is greater than an in-plane electrical resistance of each display electrode, in order to control an electric potential for the opposed electrode 21 independently. It is preferable for at least an electrical resistance between respective display electrodes to be greater than or equal to 500 times in-plane an electrical resistance of each display electrode. Although it is possible to control a property of insulation between respective display electrodes by a layer thickness of an electrochromic layer, it is preferable to form and control the insulating layer 13, etc. Furthermore, when a third or fourth display electrode and an increased electrochromic layer are provided similarly, it is also preferable to insert an insulating layer for compensating a property of insulation between respective adjacent display electrodes.

As long as a material(s) for forming the insulating layer 13, etc., is/are porous, no particular limitation is provided thereto, and an organic material and inorganic material with a high insulating property, a high durability, and an excellent film formation property and a composite thereof are preferable.

For a method for forming a porous film, it is possible to use a formation method such as a sintering method (wherein polymer fine particles or inorganic particles are partially fused by adding a binder, etc., thereto, and a pore generated among particles is utilized), an extraction method (wherein a layer composed of an organic material or inorganic material soluble in a solvent and a binder insoluble in the solvent, etc., is formed and subsequently the organic material or inorganic material is dissolved in the solvent to obtain a pore), a foaming method in which a polymer, etc., is heated, degassed, etc., to be foamed, a phase conversion method in which a good solvent and a poor solvent are operated to cause phase separation of a mixture of polymers, or a radiation irradiation method in which each kind of a radiation ray is emitted to form a pore.

Specifically, it is possible to provide, for example, a polymer-mixed particle film composed of a metal oxide fine particle (an $SiO_2$ particle, an $Al_2O_3$ particle, etc.) and a polymer binding agent, a porous organic film (a polyurethane resin or a polyethylene resin), an inorganic insulating material film formed into a porous film, etc.

As described above, when the insulating layer 13 also serves as an underlying layer for forming a fine through-hole 14a on the second display electrode 14, etc., an irregularity of the insulating layer 13 also depends on a film thickness of the second display electrode 14, etc., and if a film thickness of the second display electrode layer 14, etc., is/are, for example, 100 nm, it is preferable for a surface roughness of the insulating layer 13 to be such that an average roughness (Ra) is greater than or equal to 10 nm and less than 100 nm. If an average roughness is less than 10 nm, a fine through-hole 14a may not be formed to be embedded in a display electrode, and if an average roughness is greater than 100 nm, a surface resistance of a display electrode that is an electrically conductive layer may be greatly lost to cause a display to be defective, etc.

Furthermore, it is preferable to combine and use the insulating layer 13 with an inorganic film. It has an effect of reducing damage to an organic material in the insulating layer 13 that is a lower layer or the first electrochromic layer 12, when the second display electrode 14 to be formed later, etc., is/are formed by sputtering.

Furthermore, a material containing at least ZnS is preferable for an inorganic film. ZnS has a characteristic in such a manner that it is possible to form a film at a high speed by sputtering without providing damage to an electrochromic layer, etc. Moreover, it is possible to use $ZnS$—$SiO_2$, $ZnS$—$SiC$, $ZnS$—$Si$, $ZnS$—$Ge$, etc., for a material containing ZnS as a main component. Herein, it is preferable for a content of ZnS to be about 50-90 mol % in order to keep a good crystallinity when an insulating layer is formed. Hence, a particularly preferable material is $ZnS$—$SiO_2$ (8/2), $ZnS$—$SiO_2$ (7/3), ZnS, $ZnS$—$ZnO$—$In_2O_3$—$Ga_2O_3$ (60/23/10/7). Such a material of the insulating layer 13 is used, so that it is possible to obtain a thin film and a good insulating effect and it is possible to prevent degradation of film strength as caused by providing multilayer or releasing of a film.

(The Second Display Electrode 14, Etc.)

Figure 3:
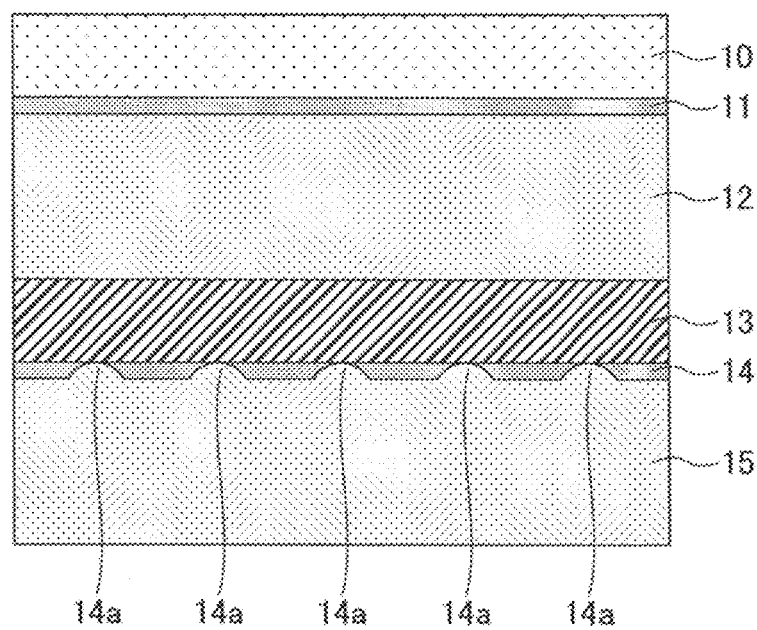

Next, the second display electrode 14 and a method for manufacturing the second display electrode 14 will be described. FIG. 3 is an enlarged view of an area surrounded by a dashed line 1A in FIG. 1. As illustrated in FIG. 2, the electrochromic display device in the present embodiment has the first display electrode 11 formed on and contacting the display substrate 10, the first electrochromic layer 12 formed on and contacting the first display electrode 11, the insulating layer 13 formed on and contacting the first electrochromic layer 12, the second display electrode 14 formed on and contacting the insulating layer 13, and the second electrochromic layer 15 formed on and contacting the second display electrode 14. A plurality of the fine through-holes 14a are formed on the second display electrode 14.

Thus, a method for forming a plurality of the fine through-holes 14a on the second display electrode 14, etc., will be described below. Additionally, a method for forming a plurality of the fine through-holes 14a on the second display electrode 14, etc., may be described as a colloidal lithography method in the present embodiment.

(A Colloidal Lithography Method)

A fine particle that is a colloidal mask used in a colloidal lithography method is any material capable of forming the fine through-hole 14a, etc., on a display electrode, and for example, a $SiO_2$ fine particle (silicon oxide fine particle), etc., are economically preferential. Furthermore, it is preferable for a dispersion used at time of distribution of a colloidal mask to have a good dispersion property, and for example, it is possible to use an aqueous $SiO_2$ fine particle, etc. However, when a lower layer under a colloidal mask, such as an electrochromic layer or an insulating porous layer is damaged, it is possible to use $SiO_2$ with a surface treated to disperse in a non-aqueous solvent so as to use a non-aqueous dispersion. Additionally, such a fine particle may be described as a colloidal mask to be used in colloidal lithography in the present embodiment.

It is for a particle diameter of a fine particle that is a colloidal mask to be greater than or equal to a film thickness of a display electrode (the second display electrode 14, etc.) on which the fine through-hole 14a is formed and less than or equal to a film thickness of an electrochromic layer (the second electrochromic layer 15, etc.) that is an electrochemically functional film formed on a display electrode (the second display electrode 14, etc.). That is because if a particle diameter of a colloidal mask is less than or equal to a film thickness of a display electrode, such a colloidal mask is embedded in a display electrode layer and becomes difficult to remove so that it is difficult to form a fine through-hole 14a. However, in such a case, a colloidal mask is frequently smaller than a film thickness of an electrochromic layer, and hence, it is possible for such an electrochromic layer to attain leveling. Accordingly, a polydispersity of a particle diameter of a colloidal mask, in particular, with respect to a small particle diameter, has a wide tolerance. Furthermore, if a particle diameter of a colloidal mask is greater than or equal to a film thickness of an electrochromic layer and it is not possible to remove 100% of such a colloidal mask, it may be difficult for an electrochromic layer to attain leveling of an irregularity of a remaining fine particle and a crack may be readily produced on such an electrochromic layer in the neighborhood thereof to cause a film release or a defective display. Furthermore, a crack, etc., may influence film formation of an upper layer in a case of a multilayer lamination, and hence, it is preferable for a particle diameter of a colloidal mask to be less than or equal to a film thickness of an electrochromic layer.

For a removal of a colloidal mask, it is possible to conduct such removal by an ultrasonic wave irradiation, a tape peeling method, etc., wherein it is preferable to select a method that provides a lower layer with a small amount of damage. In a case of mask removal by a tape peeling method, a thickness of an adhesive layer of a general tape is greater than or equal to 1 μm and a colloidal mask is frequently embedded therein. In such a case, an adhesive layer contacts a surface of the second display electrode 14, etc., that is/are an intermediate electrode(s), and hence, it is preferable to use a tape with a small amount of residual paste. In a case of mask removal by ultrasonic wave irradiation, a solvent that provides a small amount of damage to each functional layer having already been formed is used for a dipping solvent.

For formation of the fine through-hole 14a, it is also possible to conduct formation thereof by a general lift-off method using a photoresist, a dry film, etc., as well as a colloidal lithography method. In such a case, it is possible to form the second display electrode 14, etc., by forming a photoresist pattern that is a desired pattern, then forming a transparent electrically conductive film for forming the second display electrode 14, etc., and subsequently removing such a photoresist pattern to remove an undesired portion of the photoresist pattern.

When the fine through-hole 14a is formed by a general lift-off method, for a photoresist to be used, it is preferable to use a negative one so that a light-irradiated surface area of an element is small in order to avoid damage on a lower layer due to light irradiation. For a negative photoresist, it is possible to provide, for example, polyvinyl cinnamate, styrylpyridinium formal-modified polyvinyl alcohol, glycol methacrylate/polyvinyl alcohol/an initiator, polyglycidyl methacrylate, halomethylated polystyrene, diazoresin, a bisazide/diene-type rubber, polyhydroxy styrene/melamine/a photo-acid-generating agent, a methylated melamine resin, a methylated urea resin, etc.

(A Multicolor Display Operation)

Next, a multicolor display operation in an electrochromic display device in the present embodiment. An electrochromic display device in the present embodiment has the structure as illustrated in FIG. 1 and is capable of providing a multicolor display readily. Specifically, because the first display electrode 11 and the second display electrode 14 are provided separately via the insulating layer 13, an arbitrary display electrode and the opposed electrode 21 are electrically connected and electric currently is applied thereto for a period of time, so that a coloring or discoloring reaction occurs in an electrochromic layer area connecting a selected arbitrary display electrode just above a selected arbitrary opposed electrode 21. That is, when any one display electrode of the first display electrode and the second display electrode and one of the plurality of arbitrary opposed electrodes 21 are selected, it is possible to provide a monochromatic high-definition display, and when both the first display electrode 11 and the second display electrode 14 and the plurality of arbitrary opposed electrodes 21, it is possible to provide a high-definition display with a color mixture of two colors.

Furthermore, an electrochromic display in the present embodiment has a display memory property, and hence, selection of the first display electrode 11 or the second display electrode 14 and selection of one of the plurality of arbitrary opposed electrodes 21 are separated temporally, so that it is possible to provide a high-definition multicolor display. In other words, the arbitrary opposed electrodes 21 are selected to select a coloring area(s) in an electrochromic layer two-dimensionally and an arbitrary display electrode among the first display electrode 11 and the second display electrode 14 is further selected so that it is possible to color or discolor an arbitrary area in each electrochromic layer three-dimensionally.

(A Method for Manufacturing an Electrochromic Display Device 1)

Figure 4:
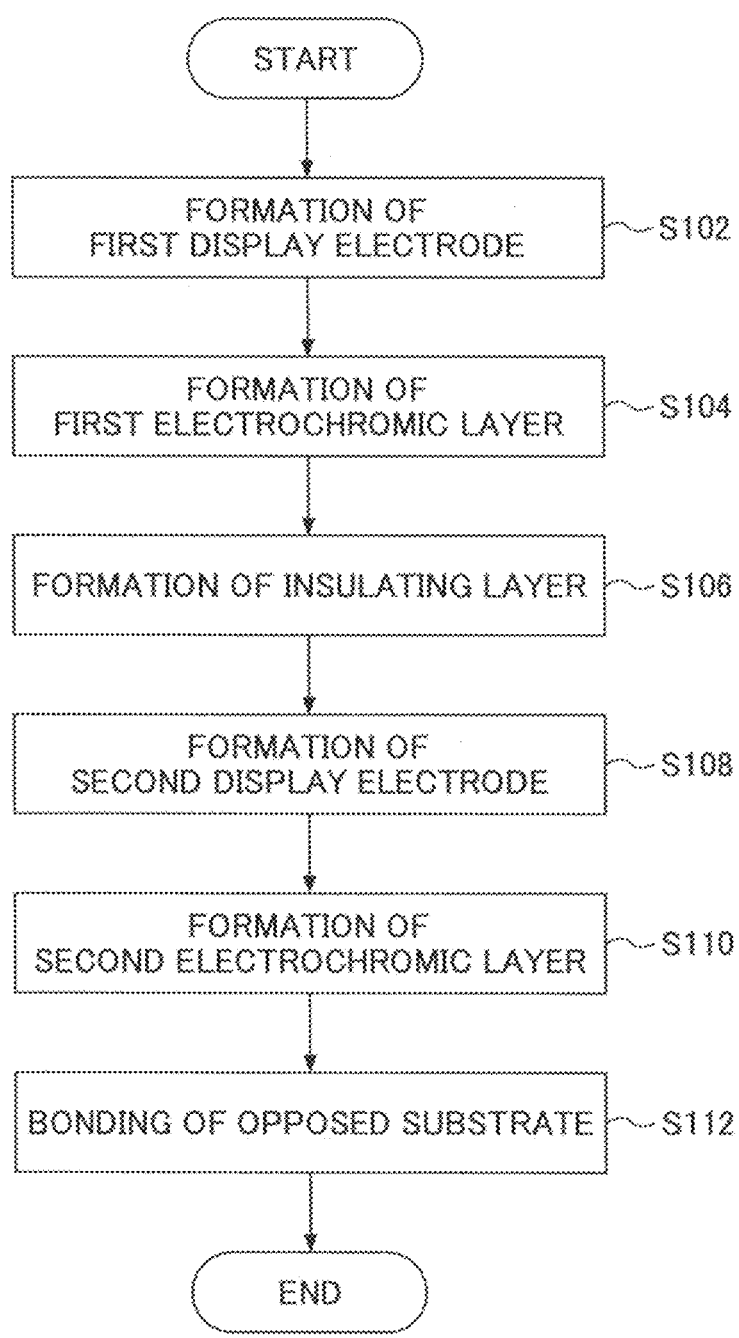
FIG. 4 is a flowchart of a method for manufacturing an electrochromic display device in the present embodiment.

Next, a method for manufacturing an electrochromic display device in the present embodiment as illustrated in FIG. 1 will be described based on FIG. 4.

First, as illustrated at step 102 (S102), a first display electrode 11 is formed on one face of a display substrate 10. Specifically, an ITO film is film-formed by sputtering, etc., to form the first display electrode 11.

Then, as illustrated at step 104 (S104), a first electrochromic layer 12 is formed on the first display electrode 11. Specifically, the first electrochromic layer 12 is formed by a method as described above.

Then, as illustrated at step 106 (S106), an insulating layer 13 is formed on the first electrochromic layer 12. Specifically, the insulating layer 13 is formed by a method as described above.

Then, as illustrated at step 108 (S108), a second display electrode 14 is formed by using a colloidal lithography method. A method for forming the second display electrode 14 by using a colloidal lithography method will specifically be described based on FIG. 5A, FIG. 5B, and FIG. 5C.

Figure 5A:
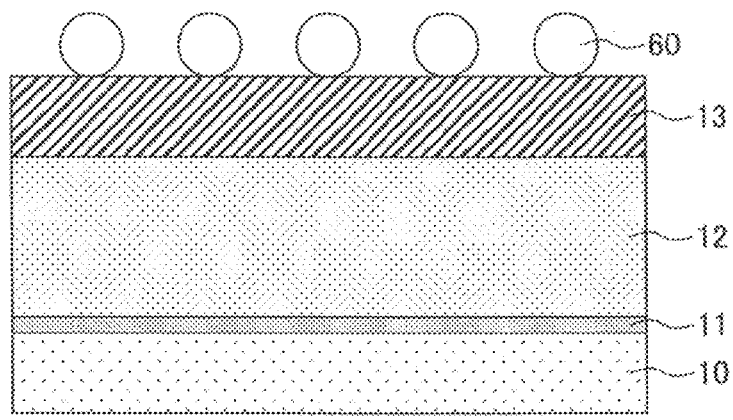
FIG. 5A, FIG. 5B, and FIG. 5C are illustration diagrams of a colloidal lithography method.

First, as illustrated in FIG. 5A, a colloidal mask 60 with a predetermined particle diameter is applied onto the insulating layer 13. Thereby, the colloidal mask 60 attaches to the insulating layer 13. The colloidal mask 60 is a spherical fine particle(s) and is formed of silicon oxide, aluminum oxide, etc.

Figure 5B:
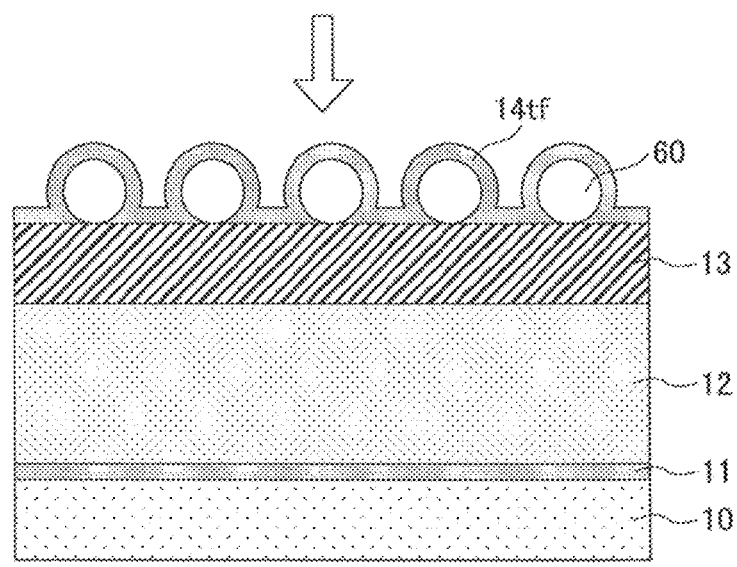

Then, as illustrated in FIG. 5B, an ITO film 14$tf$ for forming the second display electrode 14 is film-formed by sputtering.

Figure 5C:
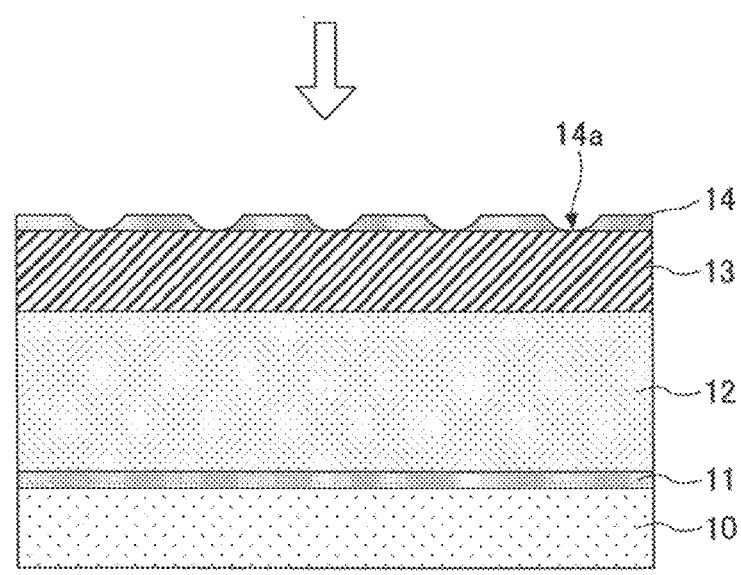
Figure 6:
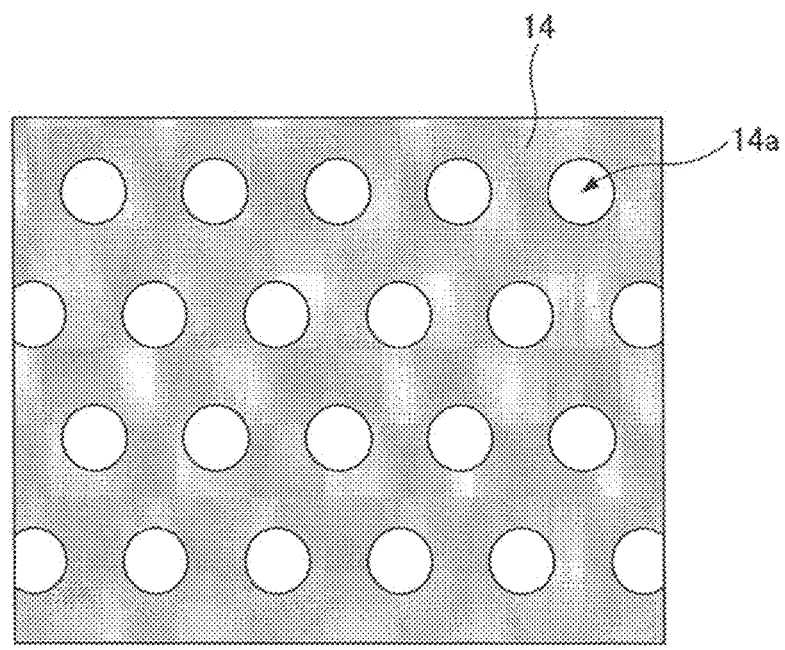
FIG. 6 is an illustration diagram of a fine through-hole 14a formed by a colloidal lithography method.

Then, as illustrated in FIG. 5C, the colloidal mask 60 and the ITO film 14$tf$ film-formed on a surface of the colloidal mask 60 are removed by ultrasonic cleaning, etc. Thereby, it is possible to form the second display electrode 14 having a generally circular fine through-hole 14$a$ in an area to which the colloidal mask attaches. FIG. 6 illustrates an overhead view of thus formed second display electrode 14.

Additionally, it is preferable for a shape of a colloidal cell 60 to be a spherical shape so that a surface area for attaching to the insulating layer 13 is small, in order to remove the colloidal cell 60 readily by ultrasonic cleaning, etc. Furthermore, it is preferable for a size of the colloidal cell 60 to be a value greater than two times of a film thickness of the ITO film 14$tf$ to form the second display electrode 14 and a value less than a film thickness of a second electrochromic layer 15 as described below.

Then, as illustrated at step 110 (S110), a second electrochromic layer 15 is formed on the second display electrode 14. Specifically, the second electrochromic layer 15 that provides coloring different from that of the first electrochromic layer 12 is formed by a formation method similar to that of the first electrochromic layer 12.

Then, as illustrated at step 112 (S112), the display substrate 10 and an opposed substrate 20 on which an opposed electrode 21 is formed are bonded. Specifically, one face of the display substrate 10 and a face of the opposed substrate 20 on which the opposed electrode 21 is formed are opposed and bonded after an electrolyte solution layer 13 and a white reflection layer 40 are interposed therebetween.

Thereby, it is possible to fabricate the electrochromic display device in the present embodiment as illustrated in FIG. 1.

(A Method for Manufacturing an Electrochromic Display Device 2)

Figure 7:
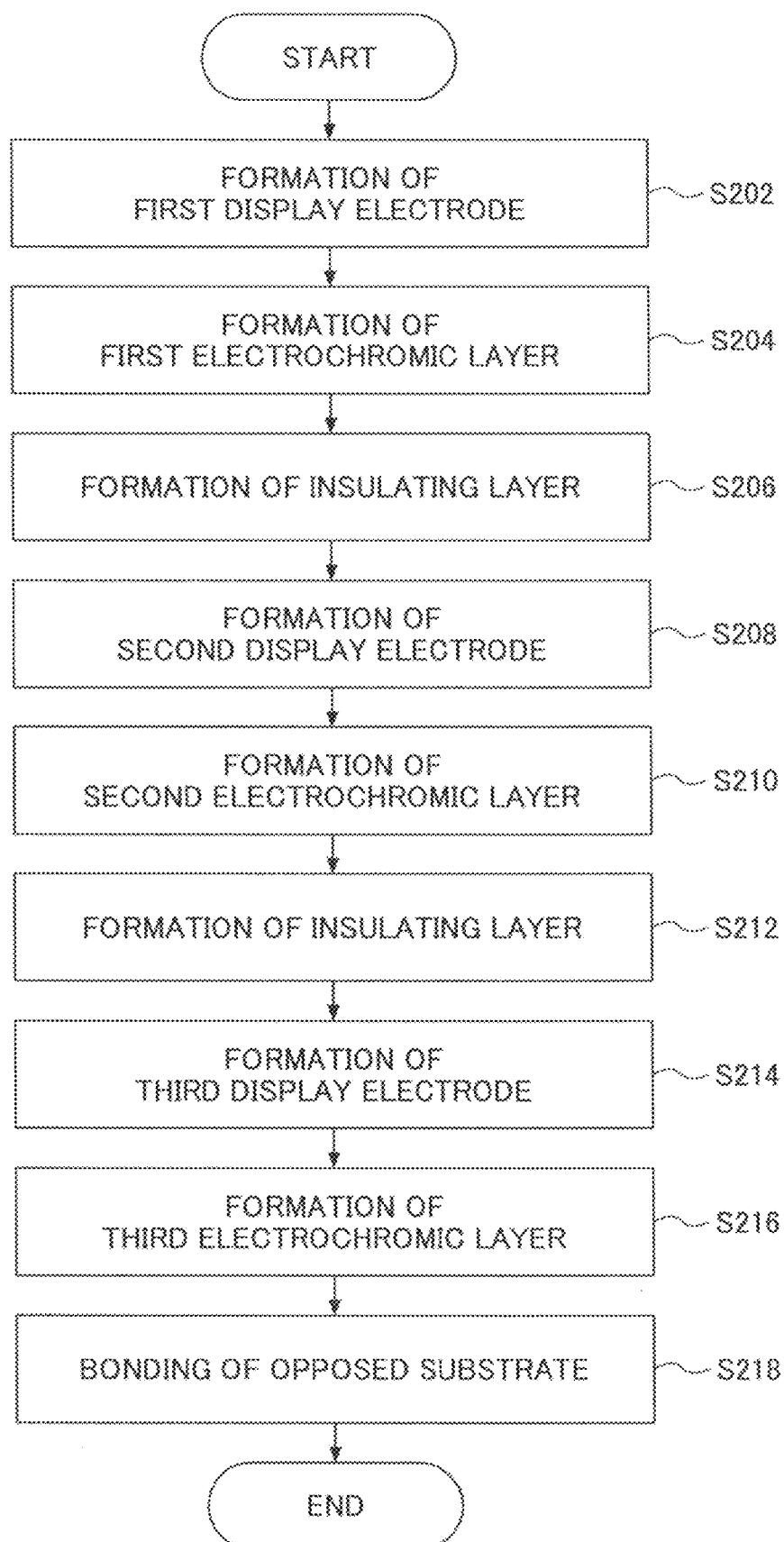
FIG. 7 is a flowchart of a method for manufacturing another electrochromic display device in the present embodiment.

Then, a method for manufacturing an electrochromic display device in the present embodiment as illustrated in FIG. 2 will be described based on FIG. 7.

First, as illustrated at step 202 (S202), a first display electrode 11 is formed on one face of a display substrate 10. Specifically, an ITO film is film-formed by sputtering, etc., and hence, the first display electrode 11 is formed.

Then, as illustrated at step 204 (S204), a first electrochromic layer 12 is formed on the first display electrode 11. Specifically, the first electrochromic layer 12 is formed by a method as described above.

Then, as illustrated at step 206 (S206), an insulating layer 13 is formed on the first electrochromic layer 12. Specifically, the insulating layer 13 is formed by a method as described above.

Then, as illustrated at step 208 (S208), a second display electrode 14 is formed by using a colloidal lithography method. A method for forming the second display electrode 14 by using a colloidal lithography method will specifically be described based on FIG. 5A, FIG. 5B. and FIG. 5C.

First, as illustrated in FIG. 5A, a colloidal mask 60 with a predetermined particle diameter is applied onto the insulating layer 13. Thereby, the colloidal mask 60 attaches to the insulating layer 13. The colloidal mask is a spherical fine particle(s) and is formed of silicon oxide, aluminum oxide, etc.

Then, as illustrated in FIG. 5B, an ITO film 14$tf$ for forming the second display electrode 14 is film-formed by sputtering.

Then, as illustrated in FIG. 5C, the colloidal mask 60 and the ITO film 14$tf$ film-formed on a surface of the colloidal mask 60 are removed by ultrasonic cleaning, etc. Thereby, it is possible to form the second display electrode 14 having a generally circular fine through-hole 14$a$ in an area to which the colloidal mask attaches. FIG. 6 illustrates an overhead view of thus formed second display electrode 14.

Additionally, it is preferable for a shape of a colloidal cell 60 to be a spherical shape so that a surface area for attaching to the insulating layer 13 is small, in order to remove the colloidal cell 60 readily by ultrasonic cleaning, etc. Furthermore, it is preferable for a size of the colloidal cell 60 to be a value greater than two times of a film thickness of the ITO film 14$tf$ to form the second display electrode 14 and a value less than a film thickness of a second electrochromic layer 15 as described below.

Then, as illustrated at step 210 (S210), a second electrochromic layer 15 is formed on the second display electrode 14. Specifically, the second electrochromic layer 15 that provides coloring different from that of the first electrochromic layer 12 is formed by a formation method similar to that of the first electrochromic layer 12.

Then, as illustrated at step 212 (S212), an insulating layer 16 is formed on the second electrochromic layer 15. Specifically, the insulating film 16 is formed by a method as described above.

Then, as illustrated at step 214 (S214), a third display electrode 17 is formed. Specifically, the third display electrode 17 is formed by using a colloidal lithography method similar to that of step 208. Thereby, it is possible to form the third display electrode 17 having a generally circular fine through-hole 17a similar to that illustrated in FIG. 6.

Figure 8:
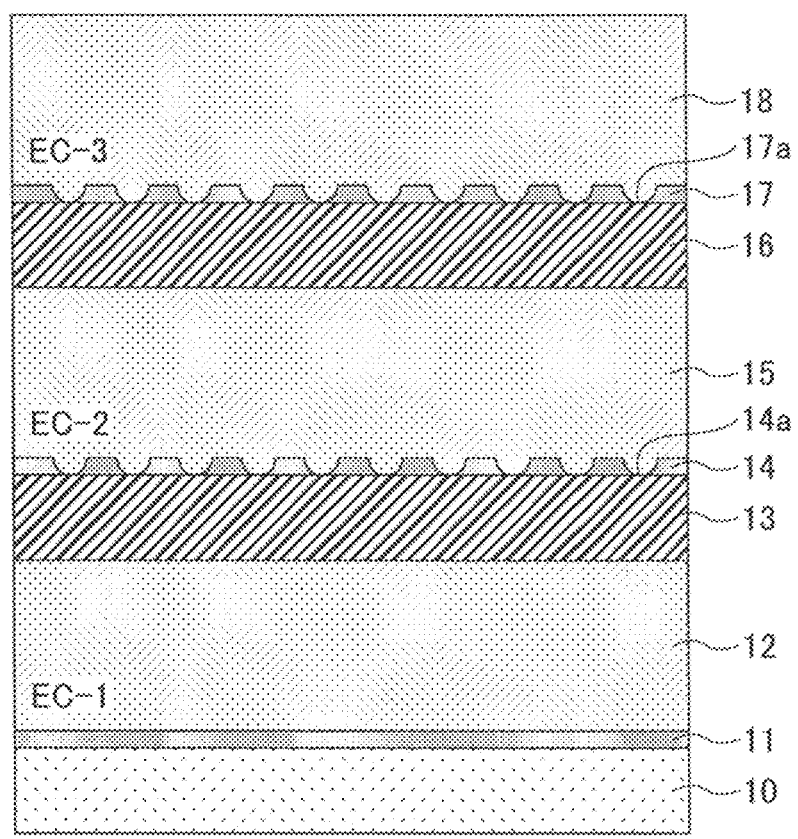
FIG. 8 is a structural diagram of a film formed on a display substrate of another electrochromic display device in the present embodiment.

Then, as illustrated at step 214 (S214), a third electrochromic layer 18 is formed on the third display electrode 17. Specifically, the third electrochromic layer 18 that provides coloring different from those of the first electrochromic layer 12 and second electrochromic layer 15 is formed by a formation method similar to those of the first electrochromic layer 12 and second electrochromic layer 15. FIG. 8 illustrates a structure of films having been formed on the display substrate 10 at such a step.

Then, as illustrated at step 216 (S216), the display substrate 10 and an opposed substrate 20 on which an opposed electrode 21 is formed are bonded. Specifically, one face of the display substrate 10 and a face of opposed substrate 20 on which the opposed electrode 21 is formed are opposed and bonded after an electrolyte solution layer 30 and a white reflection layer 40 are interposed therebetween.

Thereby, it is possible to fabricate an electrochromic display device in the present embodiment as illustrated in FIG. 2.

PRACTICAL EXAMPLES

An Evaluation of Colloidal Lithography

Practical Example 1

A result of colloidal lithography conducted by using each of colloidal masks with particle diameters of 200 nm, 450 nm, and 1200 nm will be described.

Figure 9A:
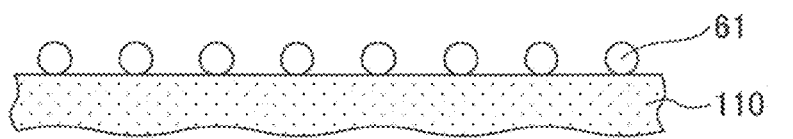
FIG. 9A, FIG. 9B, and FIG. 9C are illustration diagrams of a case where a colloidal mask with a particle diameter of 200 nm is used.
Figure 9B:
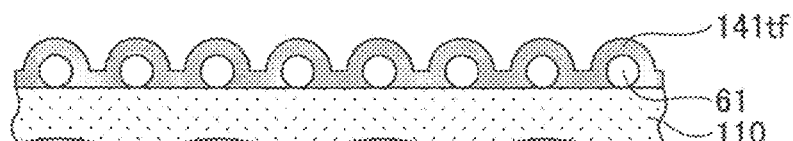
Figure 9C:
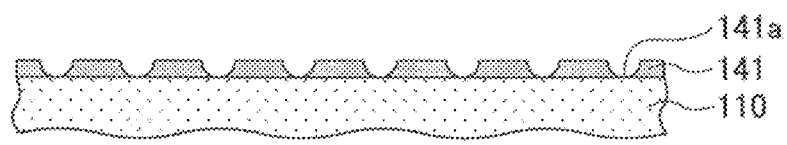

Specifically, when a colloidal mask 61 with a particle diameter of 200 nm is used as illustrated in FIG. 9A, FIG. 9B, and FIG. 9C, an electrode film 141 having a fine through-hole 141a is formed by applying the colloidal mask 61 with a particle diameter of 200 nm onto a surface of a substrate 110 to be attached thereto, as illustrated in FIG. 9A, film-forming an ITO film 141tf by sputtering as illustrated in FIG. 9B, and removing the colloidal mask 61 with a particle diameter of 200 nm by ultrasonic cleaning, etc., as illustrated in FIG. 9C.

Figure 10A:
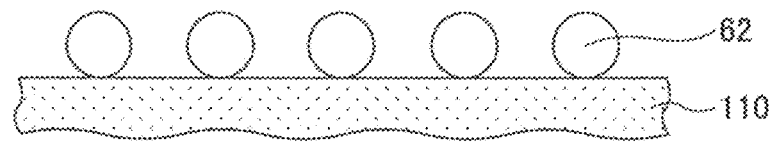
FIG. 10A, FIG. 10B, and FIG. 10C are illustration diagrams of a case where a colloidal mask with a particle diameter of 450 nm is used.
Figure 10B:
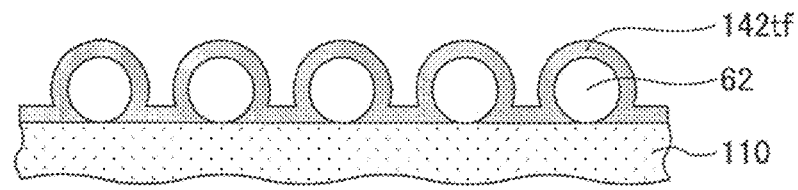
Figure 10C:
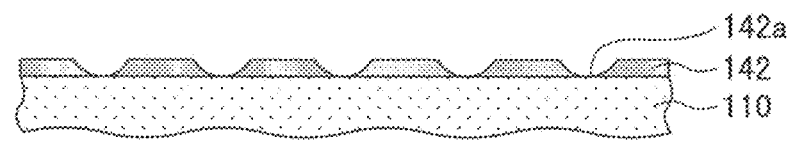

Furthermore, when a colloidal mask 62 with a particle diameter of 450 nm is used as illustrated in FIG. 10A, FIG. 10B, and FIG. 10C, an electrode film 142 having a fine through-hole 142a is formed by applying the colloidal mask 62 with a particle diameter of 450 nm onto a surface of a substrate 110 to be attached thereto, as illustrated in FIG. 10A, film-forming an ITO film 142tf by sputtering as illustrated in FIG. 10B, and removing the colloidal mask 62 with a particle diameter of 450 nm by ultrasonic cleaning, etc., as illustrated in FIG. 10C.

Figure 11A:
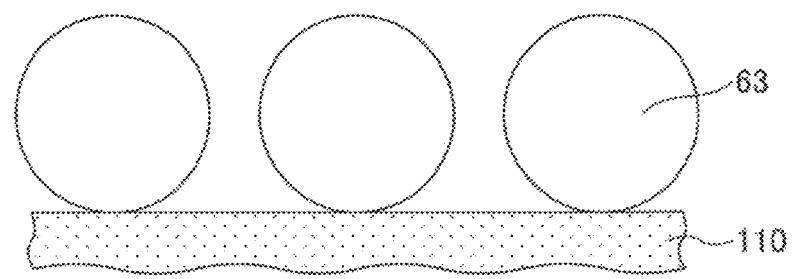
FIG. 11A, FIG. 11B, and FIG. 11C are illustration diagrams of a case where a colloidal mask with a particle diameter of 1200 nm is used.
Figure 11B:
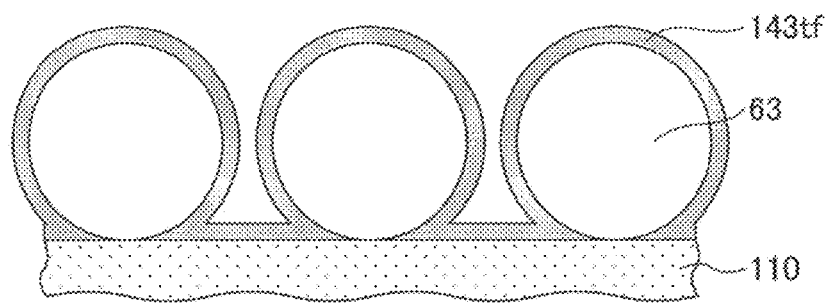
Figure 11C:
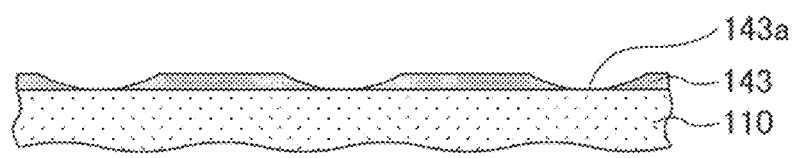

Furthermore, when a colloidal mask 63 with a particle diameter of 1200 nm is used as illustrated in FIG. 11A, FIG. 11B, and FIG. 11C, an electrode film 143 having a fine through-hole 143a is formed by applying the colloidal mask 63 with a particle diameter of 1200 nm onto a surface of a substrate 110 to be attached thereto, as illustrated in FIG. 11A, film-forming an ITO film 143tf by sputtering as illustrated in FIG. 11B, and removing the colloidal mask 63 with a particle diameter of 1200 nm by ultrasonic cleaning, etc., as illustrated in FIG. 11C.

Figure 12A:
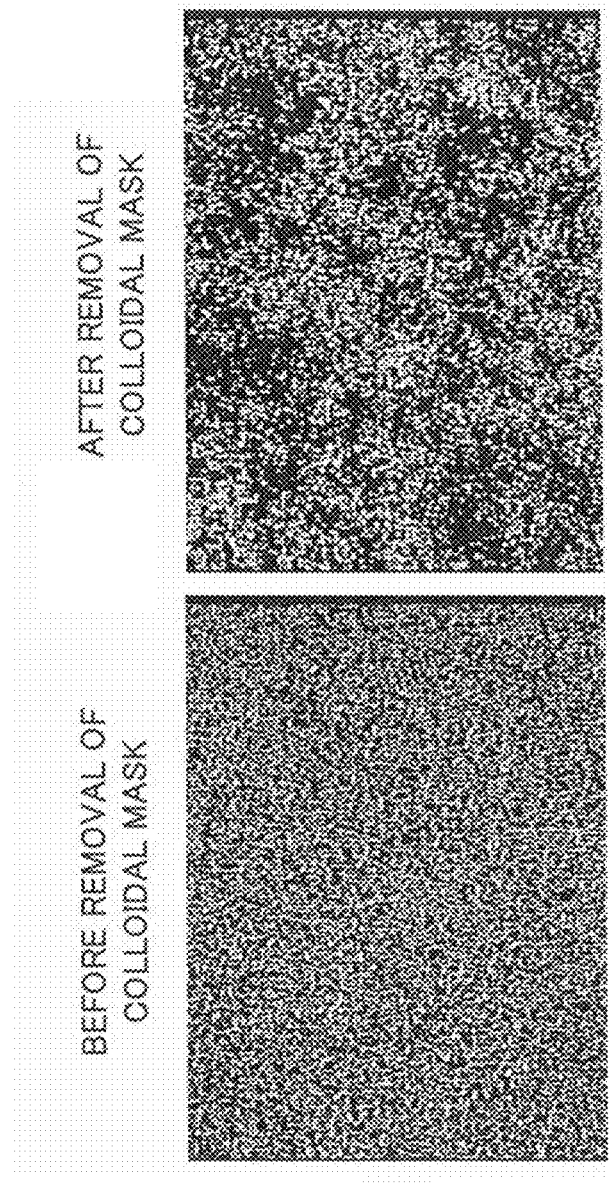
Figure 12B:
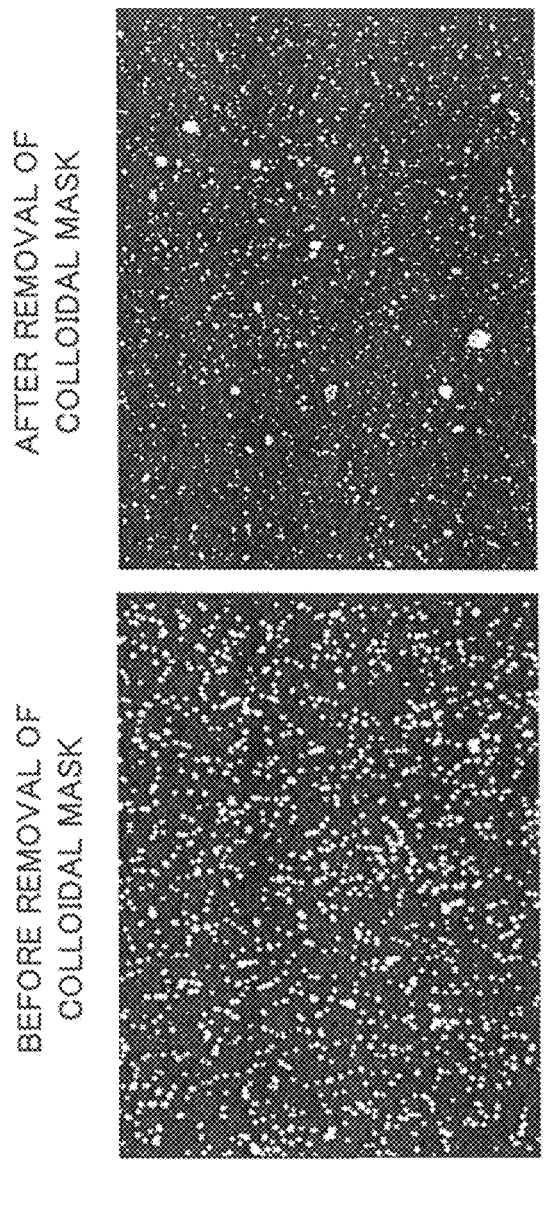

FIG. 12A, FIG. 12B, and FIG. 12C are optically microscopic photographs before and after removal of a colloidal mask in a case where each of $SiO_2$ fine particles with particle diameters of 200 nm, 450 nm, and 1200 nm is dispersed in isopropyl alcohol (IPA), then an ITO transparent electrically conductive film is film-formed by sputtering in such a manner that a film thickness is 100 nm, and a distributed colloidal mask is removed. Additionally, FIG. 12A is an optically microscopic photograph before and after removal of a colloidal mask in a case where a particle diameter of $SiO_2$ fine particle applied on a glass substrate is 200 nm, FIG. 12B is an optically microscopic photograph before and after removal of a colloidal mask in a case where a particle diameter of $SiO_2$ fine particle applied on a glass substrate is 450 nm, and FIG. 12C is an optically microscopic photograph before and after removal of a colloidal mask in a case where a particle diameter of $SiO_2$ fine particle applied on a glass substrate is 1200 nm. FIG. 12A, FIG. 12B, and FIG. 12C are observations with epi-illumination light and in a dark field, wherein light scattered from an interface is observed, and hence, light scattered from a particle surface appears to shine more widely than a particle diameter before removal of a colloidal mask and appears to shine more narrowly than before removal thereof, after removal of the colloidal mask, due to scattering from an inclined part of a through-hole. Furthermore, removal of a colloidal mask is conducted by conducting ultrasonic wave irradiation (ultrasonic cleaning) in IPA for 3 minutes. As a result, whereas an irregularity of removal of a colloidal mask was large with respect to a particle diameter of 200 nm, it was possible to remove generally 1000 of a colloidal mask with respect to particle diameters of 450 nm and 1200 nm.

Furthermore, while a titanium oxide fine particle dispersion fluid (SP210 SHOWA TITANIUM) was spin-coated thereon and an anneal treatment at a temperature of 120° C. for 15 minutes was conducted to form a titanium oxide particle film with a thickness of about 1 μm, an evaluation of a film formation property was conducted, wherein there was a portion on which a crack was generated in a particle film in the neighborhood of 1200 nm of a colloidal mask that had not been removed and leveling with the titanium oxide particle film was not sufficient. Table 1 summarizes the content(s) described above.

Additionally, based on Table 1, when 100 nm of an ITO film is film-formed and a film thickness of an electrochromic layer as described below is 1 μm, it is preferable for a particle diameter CM of a colloidal mask to be 200 nm<CM≤1 μm. That is, it is preferable for a particle diameter CM of a colloidal mask to be a value greater than two times of a film thickness of an ITO film and less than or equal to a film thickness of an electrochromic layer.

TABLE 1

| Particle diameter | Removal | Leveling |
| --- | --- | --- |
| 200 nm | Δ (partial presence of a removal irregularity) | ○ |
| 450 nm | ○ | ○ |

TABLE 1-continued

| Particle diameter | Removal | Leveling |
|---|---|---|
| 1200 nm | ◯ | ▲ (partial presence of a crack) |

Practical Examples for an Evaluation of an Electrode Characteristic

Then, an evaluation element of an ITO transparent electrically conductive film that was film-formed on a 40 nm☐ (40 nm×40 nm) glass substrate by sputtering was fabricated and an evaluation of an electrode characteristic thereof was conducted, in order to evaluate an electrode characteristic of an electrode on which a fine through-hole was formed by colloidal lithography. Additionally, an ITO transparent electrically conductive film that was film-formed by sputtering was formed on a 2 mm×32 mm area and areas of extraction portions at both ends thereof via a metal mask and a value of resistance between the extraction portions at both ends was measured to conduct an evaluation of an electrode characteristic.

Additionally, when colloidal lithography was conducted in the practical examples, $SiO_2$ fine particles with a particle diameter of 450 nm were used as a colloidal mask. The $SiO_2$ fine particles were dispersed in IPA and then distributed on a glass substrate by a spin-coat method, subsequently an ITO transparent electrically conductive film was film-formed by sputtering in such a manner that a film thickness is 100 nm, subsequently the substrate on which the ITO transparent electrically conductive film had been film-formed was dipped into IPA, then ultrasonic wave irradiation was conducted for 3 minutes, and an evaluation of an electrode characteristic was conducted before and after a treatment of colloidal mask removal.

Comparative Example 1

Comparative example 1 will be described. In Comparative example 1, 100 nm of an ITO sputtering film was simply film-formed on a glass substrate by sputtering without conducting colloidal lithography and an electrode resistance was measured.

Comparative Example 2

Next, Comparative example 2 will be described. In Comparative example 2, a silica fine particle dispersion fluid with an average primary particle diameter of 20 nm (silica solid concentration: 13 wt %, aqueous polyester-type urethane resin (HW350, DIC Corporation): 2 wt %, and 2,2,3,3,-tetrafluoropropanol: 85 wt %) was spin-coated onto a substrate, etc., without conducting colloidal lithography, to form about 1 μm of an insulating porous layer, subsequently 100 nm of an ITO sputtering film was film-formed by sputtering, and an electrode resistance was measured.

Practical Example 2

Next, Practical example 2 will be described. In Practical example 2, a silica fine particle dispersion fluid with an average primary particle diameter of 20 nm (silica solid concentration: 13 wt %, an aqueous polyester-based urethane resin (HW350, DIC Corporation): 2 wt %, and 2,2,3,3-tetrafluoropropanol: 85 wt %) was spin-coated onto a substrate, etc., to form about 1 μm of an insulating porous layer, subsequently a colloidal mask was formed, then 100 nm of an ITO sputtering film was film-formed by sputtering, then the colloidal mask was removed, and an electrode resistance was measured.

Practical Example 3

Next, Practical example 3 will be described. In Practical example 3, a silica fine particle dispersion fluid with an average primary particle diameter of 20 nm (silica solid concentration: 13 wt %, a polyvinyl alcohol resin (PVA 500): 2 wt %, and 2,2,3,3-tetrafluoropropanol: 85 wt %) was spin-coated onto a substrate, etc., to form about 1 μm of an insulating porous layer, subsequently a colloidal mask was formed, then 100 nm of an ITO sputtering film was film-formed by sputtering, then the colloidal mask was removed, and an electrode resistance was measured.

Table 2 illustrates values of electrical resistances measured in Comparative examples 1 and 2 and Practical examples 2 and 3.

TABLE 2

|  | Electrode resistance (before mask removal) | Electrode resistance (after mask removal) |
|---|---|---|
| Comparative example 1 | 2.0 kΩ | — |
| Comparative example 2 | 2.2 kΩ | 2.2 kΩ |
| Practical example 2 | 2.5 kΩ | 2.5 kΩ |
| Practical example 3 | 3.5 kΩ | 3.5 kΩ |

Electrical resistances measured in Practical examples 2 and 3 were slightly higher values than that of Comparative example 2 because a fine through-hole 14a was formed, but was less than or equal to two times of that of Comparative example 1, wherein the electrical resistances were not extremely high. Hence, it is possible to be used in a display electrode, etc., without a particular problem. Hence, in a method for manufacturing an electrochromic display device in the present embodiment, it is possible to form a fine through-hole 14a, etc., effectively by colloidal lithography, without damaging an electrical conductivity of an ITO sputtering film even on an insulating porous layer.

An Evaluation of an Operation of a Multilayer Laminated Electrochromic Display Device Practical Example 4

Fabrication of a First Display Electrode and a First Electrochromic Layer

About 100 nm of an ITO film was formed on a 20 mm×20 mm area and an extraction portion of a 40 mm×40 mm glass substrate that was a display substrate 10 by a sputtering method via a metal mask to fabricate a first display electrode 11. A titanium oxide fine particle dispersion fluid (SP210 SHOWA TITANIUM) was spin-coated thereon and an anneal treatment at 120° C. for 15 minutes was conducted to form a titanium oxide particle film. Subsequently, a 1 wt % solution of a viologen compound that was an electrochromic compound developing a magenta color in 2,2,3,3-tetrafluoropropanol was further spin-coated thereon and an anneal treatment at a temperature of 120° C. for 10 minutes was conducted to form a first electrochromic layer 12 that was composed of titanium oxide particles and the electrochromic compound.

Fabrication of an Insulating Layer

Then, a silica fine particle dispersion fluid with an average primary particle diameter of 20 nm (silica solid concentration: 13 wt %, an aqueous polyester-type urethane resin (HW350, DIC Corporation): 2 wt %, 2,2,3,3-tetrafluoropropanol: 85 wt %) was spin-coated, and subsequently, a silica fine particle dispersion fluid with an average primary particle diameter of 80 nm (silica solid concentration: 1 wt %, an aqueous polyester-type urethane resin (HW350, DIC Corporation): 4 wt %, 2,2,3,3-tetrafluoropropanol: 95 wt %) was spin-coated to form an insulating layer 13. A film thickness of the insulating layer 13 is about 1 μm.

Fabrication of a Second Display Electrode

Figure 14:
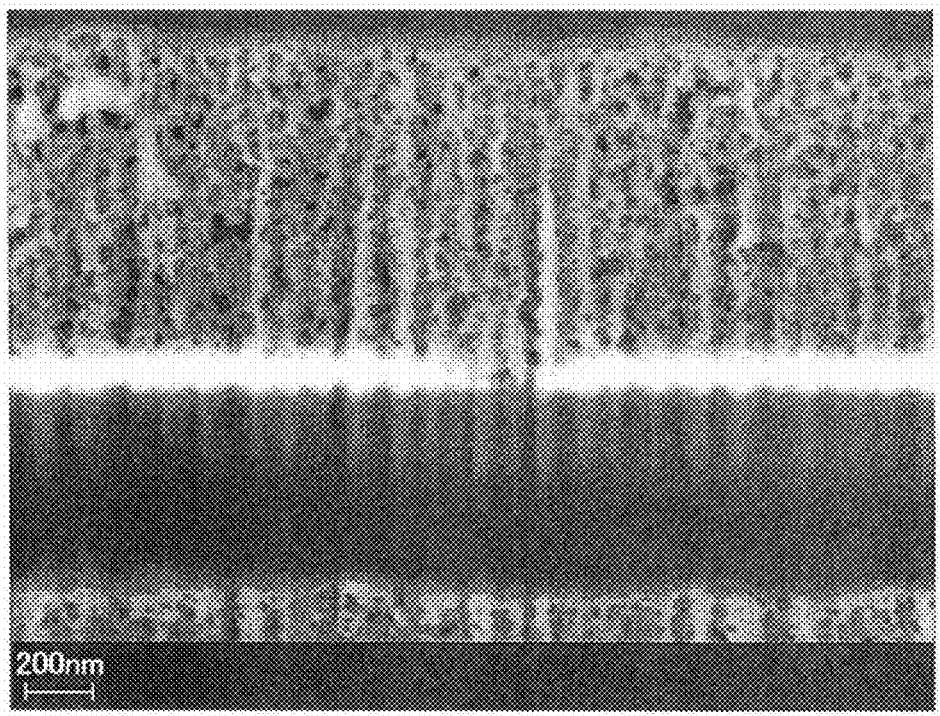
FIG. 14 is a cross-sectional SEM image of a fine through-hole formed in practical example 4.
Figure 15:
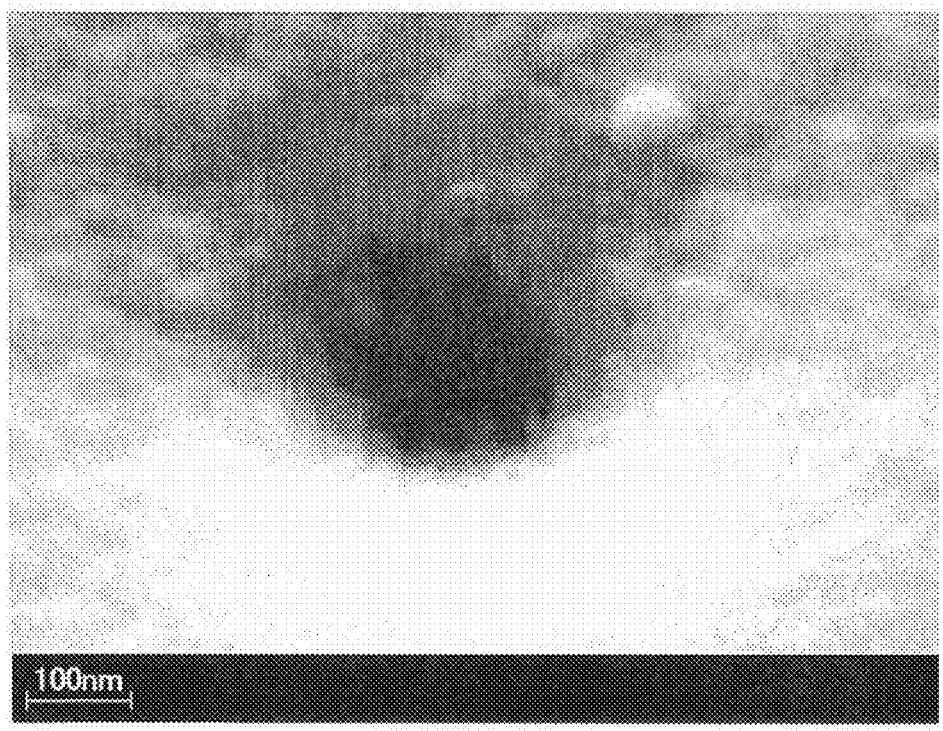
FIG. 15 is an SEM image of a fine through-hole formed in practical example 4.

Then, 450 nm $SiO_2$ fine particles dispersed in IPA at a concentration of 1 wt % was distributed thereon by a spin coat method, and further thereon, about 100 nm of an ITO transparent electrically conductive film was formed on a 20 mm×20 mm area that was a portion superposing on the ITO film formed for the first display electrode 11 by a sputtering method via a metal mask and an extraction portion was formed on a portion different from the first display electrode 11, so that a second display electrode 14 was fabricated. Subsequently, ultrasonic wave irradiation was conducted in IPA for 3 minutes to conduct a treatment of removal of a colloidal mask. FIG. 13A and FIG. 13B illustrate scanning electron microscope (SEM) images before and after removal of a colloidal mask (before and after ultrasonic wave irradiation) at that time, FIG. 14 illustrates a cross-sectional SEM image after removal of a colloidal mask, and FIG. 15 illustrates an SEM image viewed in an oblique direction after removal of a colloidal mask. Additionally, FIG. 13A illustrates an SEM image before removal of a colloidal mask and FIG. 13B illustrates an SEM image after removal of a colloidal mask. In SEM images illustrated in FIG. 13A and FIG. 13B, about 300 nm or less of a fine through-hole was formed for a colloidal mask with an average primary particle diameter of 450 nm, and it was confirmed from a cross-sectional SEM image that upper and lower functional layers were bonded via a fine through-hole. Furthermore, a resistance between an extraction portion of the first display electrode 11 and an extraction portion of the second display electrode 14 was greater than or equal to 40 MΩ to provide an insulated condition.

Fabrication of a Second Electrochromic Layer

Then, a titanium oxide fine particle dispersion fluid (SP210 SHOWA TITANIUM) was spin-coated thereon and an anneal treatment at a temperature of 120° C. for 15 minutes was conducted to form a titanium oxide particle film, and further, a 1 wt % solution of a viologen compound that was an electrochromic compound developing a yellow color in 2,2,3,3-tetrafluoropropanol was spin-coated thereon and an anneal treatment at a temperature of 120° C. for 10 minutes was conducted to form a second electrochromic layer 15 that was composed of titanium oxide particles and the electrochromic compound.

Fabrication of an Opposed Electrode

About 100 nm of ITO films were film-formed on three 7 mm×15 mm areas and respective extraction portions of a 40 mm×40 mm glass substrate that was an opposed substrate 20 by a sputtering method via a metal mask to provide an opposed electrode 21.

Fabrication of an Electrochromic Display Device

An electrolyte solution in which 20 wt % of white titanium oxide particles (trade name: CR50 produced by ISHIHARA SANGYO KAISHA, LTD., an average particle diameter: about 250 nm) were added into a solution in which tetrabutylammonium perchlorate as an electrolyte, dimethyl sulfoxide and polyethylene glycol (molecular weight: 200) as solvents, and further a UV-curable adhesive (trade name: PTC10 produced by JUJO CHEMICAL CO., LTD.) were mixed at 1.2:5.4:6:16, was prepared, and dropped and applied to a side of the opposed substrate 20, and subsequently, superposition with the display substrate 10 and UV irradiation curing from a side of the opposed substrate 20 were conducted for bonding thereof, so that an electrochromic display device in Practical example 4 was fabricated. Additionally, a thickness of an electrolyte layer was set at 10 μm by mixing 0.2 wt % of a bead spacer into the electrolyte layer.

A Coloring Test

An evaluation of coloring of a fabricated electrochromic display device in Practical example 4 was conducted. While two of the three opposed electrodes 20 were connected to a cathode and the first display electrode 11 was connected to an anode, a voltage of +6 V was applied for 1500 milliseconds by using a constant voltage power supply until a sufficient color optical density was provided. A magenta color area that reflected a shape of two selected opposed electrodes was observed on the first electrochromic layer 12. Subsequently, while both one of the previously selected opposed electrodes 20 and one more non-selected one were connected to a cathode and the second display electrode 14 was connected to an anode, a voltage of +6 V was applied for 500 milliseconds by using a constant voltage power supply until a sufficient color optical density was provided. A yellow area that reflected a shape of two selected opposed electrodes 20 was observed on the second electrochromic layer 15. Among these, an area of red that was a subtractive color mixture of magenta and yellow was observed just above a continuously selected opposed electrode 20.

Although an embodiment of the present invention has been described, the content(s) described above shall not limit a content(s) of an embodiment of the present invention.

APPENDIX

An Illustrative Embodiment(s) of a Method for Manufacturing an Electrochromic Display Device and an Electrochromic Display Device At least one illustrative embodiment of the present invention may relate to at least one of a method for manufacturing an electrochromic display device and an electrochromic display device.

An object of at least one illustrative embodiment of the present invention may be to provide an electrochromic display device with a low driving voltage and an excellent display quality by forming a display electrode capable of being readily manufactured and excellent in an electrical conductivity and ion permeability.

At least one illustrative embodiment of the present invention may be characterized by having a step of forming one display electrode on a display substrate, a step of forming one electrochromic layer on the one display electrode, a step of forming an insulating layer on the one electrochromic layer, a step of applying and attaching a fine particle with a predetermined particle diameter to the insulating layer, a step of film-forming a transparent electrically conductive film after the fine particle is applied thereto, a step of removing the fine particle to remove a transparent electrically conductive film attached to a surface of the fine particle and to form an other display electrode having a fine through-hole at a position at which the fine particle has attached thereto, a step of forming an other electrochromic layer on the other display electrode, and a step of opposing an opposed substrate on which an opposed electrode is formed to the display substrate on which the other electrochromic layer is formed, via an electrolyte solution and bonding the other electrochromic layer and the opposed electrode.

Furthermore, at least one illustrative embodiment of the present invention may be characterized by having a step of applying and attaching a fine particle with a predetermined particle diameter to a display substrate, a step of film-forming a transparent electrically conductive film after the fine particle is applied thereto, a step of removing the fine particle to remove a transparent electrically conductive film attached to a surface of the fine particle and to form a display electrode having a fine through-hole at a position at which the fine particle has been attached thereto, and a step of forming an electrochromic layer on the display electrode.

Furthermore, at least one illustrative embodiment of the present invention may be characterized by having a display substrate, an opposed substrate arranged to oppose the display substrate, one display electrode formed on a face of the display substrate at a side at which the opposed substrate is provided, one electrochromic layer formed on the one display electrode, an insulating layer formed on the one electrochromic layer, an other display electrode formed on the insulating layer, an other electrochromic layer formed on the other display electrode, an opposed electrode formed on a face of the opposed substrate which opposes a face of the display substrate on which the other electrochromic layer is formed, and an electrolyte solution provided between the display substrate and the opposed substrate, wherein the other display electrode is provided with a fine through-hole through which an ion in the electrolyte solution passes, and layers contacting both faces of the other display electrode contact each other in the fine through-hole.

Illustrative Embodiment (1) is a method for manufacturing an electrochromic display device characterized by having a step of forming one display electrode on a display substrate, a step of forming one electrochromic layer on the one display electrode, a step of forming an insulating layer on the one electrochromic layer, a step of applying and attaching a fine particle with a predetermined particle diameter to the insulating layer, a step of film-forming a transparent electrically conductive film after the fine particle is applied thereto, a step of removing the fine particle to remove a transparent electrically conductive film attached to a surface of the fine particle and to form an other display electrode having a fine through-hole at a position at which the fine particle has attached thereto, a step of forming an other electrochromic layer on the other display electrode, and a step of opposing an opposed substrate on which an opposed electrode is formed to the display substrate on which the other electrochromic layer is formed, via an electrolyte solution and bonding the other electrochromic layer and the opposed electrode.

Illustrative Embodiment (2) is the method for manufacturing an electrochromic display device as described in Illustrative Embodiment (1), characterized by having a plurality of the insulating films, the other display electrodes, and the other electrochromic layers, wherein the plurality of the insulating films, the other display electrodes, and the other electrochromic layers are formed by sequentially and repeatedly conducting the step of forming an insulating layer, the step of applying and attaching a fine particle, the step of film-forming a transparent electrically conductive film, the step of forming an other display electrode, and the step of forming an other electrochromic layer.

Illustrative Embodiment (3) is the method for manufacturing an electrochromic display device as described in Illustrative Embodiment (1) or (2), characterized in that an average particle diameter of the fine particle is a value greater than a film thickness of a transparent electrically conductive film forming the other display electrode and less than or equal to a film thickness of the other electrochromic layer.

Illustrative Embodiment (4) is a method for manufacturing an electrochromic display device characterized by having a step of applying and attaching a fine particle with a predetermined particle diameter to a display substrate, a step of film-forming a transparent electrically conductive film after the fine particle is applied thereto, a step of removing the fine particle to remove a transparent electrically conductive film attached to a surface of the fine particle and to form a display electrode having a fine through-hole at a position at which the fine particle has been attached thereto, and a step of forming an electrochromic layer on the display electrode.

Illustrative Embodiment (5) is the method for manufacturing an electrochromic display device as described in any of Illustrative Embodiments (1) to (4), characterized in that the fine particle is spherical.

Illustrative Embodiment (6) is the method for manufacturing an electrochromic display device as described in any of Illustrative Embodiments (1) to (5), characterized in that the fine particle is formed of a material including silicon oxide.

Illustrative Embodiment (7) is the method for manufacturing an electrochromic display device as described in any of Illustrative Embodiments (1) to (6), characterized in that an average particle diameter of the fine particle is 200 nm$<$CM$\leq$1 µm, where CM is an average particle diameter of the fine particle.

Illustrative Embodiment (8) is the method for manufacturing an electrochromic display device as described in any of Illustrative Embodiments (1) to (7), characterized in that removal of the fine particle is conducted by using ultrasonic vibration.

Illustrative Embodiment (9) is an electrochromic display device characterized by having a display substrate, an opposed substrate arranged to oppose the display substrate, one display electrode formed on a face of the display substrate at a side at which the opposed substrate is provided, one electrochromic layer formed on the one display electrode, an insulating layer formed on the one electrochromic layer, an other display electrode formed on the insulating layer, an other electrochromic layer formed on the other display electrode, an opposed electrode formed on a face of the opposed substrate which opposes a face of the display substrate on which the other electrochromic layer is formed, and an electrolyte solution provided between the display substrate and the opposed substrate, wherein the other display electrode is provided with a fine through-hole through which an ion in the electrolyte solution passes, and layers contacting both faces of the other display electrode contact each other in the fine through-hole.

Illustrative Embodiment (10) is the electrochromic display device as described in Illustrative Embodiment (9), characterized in that the fine through-hole includes a circular shape.

Illustrative Embodiment (11) is the electrochromic display device as described in Illustrative Embodiment (9) or (10), characterized in that a diameter of the fine through-hole is 0.01 μm-100 μm.

According to at least one illustrative embodiment of the present invention, it may be possible to provide an electrochromic display device with a low driving voltage and an excellent display quality because a display electrode capable of being readily manufactured and excellent in an electrical conductivity and ion permeability is had thereby.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application claims the benefit of priority based on Japanese Patent Application No. 2012-082240 filed on Mar. 30, 2012, the entire content of which is hereby incorporated by reference herein.

What is claimed is:

1. A method for manufacturing an electrochromic display device, comprising:
    a step of forming one display electrode on a display substrate;
    a step of forming one electrochromic layer on the one display electrode;
    a step of forming an insulating layer on the one electrochromic layer;
    a step of applying and attaching a fine particle with a predetermined particle diameter to the insulating layer;
    a step of film-forming a transparent electrically conductive film after the fine particle is applied thereto;
    a step of removing the fine particle to remove a transparent electrically conductive film attached to a surface of the fine particle and to form an other display electrode having a fine through-hole at a position at which the fine particle has attached thereto;
    a step of forming an other electrochromic layer on the other display electrode; and
    a step of opposing an opposed substrate on which an opposed electrode is formed to the display substrate on which the other electrochromic layer is formed, via an electrolyte solution and bonding the other electrochromic layer and the opposed electrode.

2. The method for manufacturing an electrochromic display device as claimed in claim 1, further comprising:
    a plurality of the insulating films, the other display electrodes, and the other electrochromic layers,
    wherein the plurality of the insulating films, the other display electrodes, and the other electrochromic layers are formed by sequentially and repeatedly conducting the step of forming an insulating layer, the step of applying and attaching a fine particle, the step of film-forming a transparent electrically conductive film, the step of forming an other display electrode, and the step of forming an other electrochromic layer.

3. The method for manufacturing an electrochromic display device as claimed in claim 1, wherein an average particle diameter of the fine particle is a value greater than a film thickness of a transparent electrically conductive film forming the other display electrode and less than or equal to a film thickness of the other electrochromic layer.

4. A method for manufacturing an electrochromic display device, comprising:
    a step of applying and attaching a fine particle with a predetermined particle diameter to a display substrate;
    a step of film-forming a transparent electrically conductive film after the fine particle is applied thereto;
    a step of removing the fine particle to remove a transparent electrically conductive film attached to a surface of the fine particle and to form a display electrode having a fine through-hole at a position at which the fine particle has been attached thereto; and
    a step of forming an electrochromic layer on the display electrode.

5. The method for manufacturing an electrochromic display device as claimed in claim 1, wherein the fine particle is spherical.

6. The method for manufacturing an electrochromic display device as claimed in claim 4, wherein the fine particle is spherical.

7. The method for manufacturing an electrochromic display device as claimed in claim 1, wherein the fine particle is formed of a material including silicon oxide.

8. The method for manufacturing an electrochromic display device as claimed in claim 4, wherein the fine particle is formed of a material including silicon oxide.

9. The method for manufacturing an electrochromic display device as claimed in claim 1, wherein an average particle diameter of the fine particle is 200 nm<CM≤1 μm, where CM is an average particle diameter of the fine particle.

10. The method for manufacturing an electrochromic display device as claimed in claim 4, wherein an average particle diameter of the fine particle is 200 nm<CM≤1 μm, where CM is an average particle diameter of the fine particle.

11. The method for manufacturing an electrochromic display device as claimed in claim 1, wherein removal of the fine particle is conducted by using ultrasonic vibration.

12. The method for manufacturing an electrochromic display device as claimed in claim 4, wherein removal of the fine particle is conducted by using ultrasonic vibration.

13. An electrochromic display device, comprising:
    a display substrate;
    an opposed substrate arranged to oppose the display substrate;
    one display electrode formed on a face of the display substrate at a side at which the opposed substrate is provided;
    one electrochromic layer formed on the one display electrode;
    an insulating layer formed on the one electrochromic layer;
    an other display electrode formed on the insulating layer;
    an other electrochromic layer formed on the other display electrode;
    an opposed electrode formed on a face of the opposed substrate which opposes a face of the display substrate on which the other electrochromic layer is formed; and
    an electrolyte solution provided between the display substrate and the opposed substrate, wherein
    the other display electrode is provided with a fine through-hole through which an ion in the electrolyte solution passes, and
    layers contacting both respective faces of the other display electrode, contact each other in the fine through-hole.

14. The electrochromic display device as claimed in claim 13, wherein the fine through-hole includes a circular shape.

15. The electrochromic display device as claimed in claim 13, wherein a diameter of the fine through-hole is 0.01 μm to 100 μm.

16. The method as claimed in claim 1, wherein layers contacting respective faces of the other display electrode contact each other in the fine through-hole.

17. The method as claimed in claim 4, wherein layers contacting respective faces of the display electrode contact each other in the fine through-hole.

* * * * *